United States Patent
Jing et al.

(10) Patent No.: US 12,045,631 B2
(45) Date of Patent: Jul. 23, 2024

(54) PAGE LOADING METHOD AND DISPLAY APPARATUS

(71) Applicants: VIDAA USA, INC., Suwanee, GA (US); VIDAA (NETHERLANDS) INTERNATIONAL HOLDINGS B.V., RZ Duiven (NL)

(72) Inventors: Doris Jing, Qingdao (CN); Lobo Li, Qingdao (CN); Bill Wu, Qingdao (CN); Louis Shang, Qingdao (CN); Ziming Zhu, Qingdao (CN)

(73) Assignees: VIDAA USA, INC., Suwanee, GA (US); VIDAA (NETHERLANDS) INTERNATIONAL HOLDINGS B.V., RZ Duiven (NL)

( * ) Notice: Subject to any disclaimer, the term of this patent is extended or adjusted under 35 U.S.C. 154(b) by 106 days.

(21) Appl. No.: 18/065,487

(22) Filed: Dec. 13, 2022

(65) Prior Publication Data
US 2023/0111113 A1    Apr. 13, 2023

Related U.S. Application Data

(63) Continuation of application No. PCT/US2021/055004, filed on Oct. 14, 2021.

(30) Foreign Application Priority Data

| | | |
|---|---|---|
| Oct. 14, 2020 | (CN) | 202011097232.5 |
| Oct. 16, 2020 | (CN) | 202011109971.1 |
| Dec. 16, 2020 | (CN) | 202011489349.8 |

(51) Int. Cl.
G06F 16/00    (2019.01)
G06F 9/445    (2018.01)
(Continued)

(52) U.S. Cl.
CPC ........ G06F 9/44505 (2013.01); G06F 16/951 (2019.01); G06F 16/955 (2019.01); G06F 16/9566 (2019.01)

(58) Field of Classification Search
CPC . G06F 9/44505; G06F 16/9566; G06F 16/951
See application file for complete search history.

(56) References Cited

U.S. PATENT DOCUMENTS 9,355,186 B2 *   5/2016   Khanna ................. G06F 16/972
9,448,776 B1    9/2016   Sankaran et al.
(Continued)

FOREIGN PATENT DOCUMENTS

CN    102577318 A    7/2012
CN    103024574 A    4/2013
(Continued)

OTHER PUBLICATIONS

Guse et al., "Subjective Quality Of Webpage Loading: The Impact Of Delayed And Missing Elements On Quality Ratings And Task Completion Time," IEEE, 2015, pp. 1-6. (Year: 2015).*

(Continued)

*Primary Examiner* — Cheryl Lewis
(74) *Attorney, Agent, or Firm* — Workman Nydegger

(57) ABSTRACT

The present application discloses a page loading method and a display apparatus. While launching an application, a URL of the application, a code package, and a URL of a loading page are obtained; when the URL of the application is a target protocol URL, a loading parameter is read from the code package; the loading parameter is written into the URL of the loading page to generate a new URL of the loading page; and based on the new URL of the loading page, a loading page including display content corresponding to the loading parameter is presented on a display.

20 Claims, 21 Drawing Sheets

(51) Int. Cl.
*G06F 16/951* (2019.01)
*G06F 16/955* (2019.01)

(56) References Cited

U.S. PATENT DOCUMENTS

| | | | |
|---|---|---|---|
| 2002/0184624 A1 | 12/2002 | Spencer | |
| 2009/0271707 A1 | 10/2009 | Lin et al. | |
| 2013/0111328 A1* | 5/2013 | Khanna | G06F 16/972 |
| | | | 715/234 |
| 2014/0173582 A1 | 6/2014 | Hofhansl et al. | |
| 2016/0034285 A1* | 2/2016 | Wang | G06F 16/9574 |
| | | | 717/121 |

FOREIGN PATENT DOCUMENTS

| | | |
|---|---|---|
| CN | 104504080 A | 4/2015 |
| CN | 104516890 A | 4/2015 |
| CN | 106970790 A | 7/2017 |
| CN | 106993009 A | 7/2017 |
| CN | 107179920 A | 9/2017 |
| CN | 107729352 A | 2/2018 |
| CN | 110764765 A | 2/2020 |
| CN | 110765381 A | 2/2020 |
| CN | 111639281 A | 9/2020 |
| CN | 111654753 A | 9/2020 |
| KR | 10-2011-0123867 A | 11/2011 |

OTHER PUBLICATIONS

International Search Report, mailed Feb. 7, 2022, from PCT/US2021/055004.
Chinese First Office Action, mailed Mar. 1, 2024, from Chinese App. No. 202011097232.5, 17 pages.
Chinese First Office Action, mailed Sep. 2, 2023, from Chinese App. No. 202011109971.1, 27 pages.
Chinese First Office Action, mailed Sep. 29, 2023, from Chinese App. No. 202011489349.8, 14 pages.
Extended European Search Report, mailed Mar. 15, 2024, from European App. No. 21881097.6, 11 pages.
Hume, "Progressive Web Apps", MEAP Edition 6, Manning Early Access Program, Jul. 25, 2017, 187 pages.

* cited by examiner

| First-Level Structure | Second-Level Structure | Third-Level Structure | Type | Required | Description Information |
|---|---|---|---|---|---|
| Pkgname | | | Str | Y | Application Package Name, e.g., com.vidaa.sports |
| Appname | | | Str | Y | Application Name, e.g., VIDAA Sport |
| Version | | | Str | Y | Version Name, e.g., 1.0.0; Mainly Used For Version Detection And Update |
| Vendor | | | Str | Y | Application Developer Name, e.g., Vidaa Inc. |
| Description | | | Str | N | Application Description |
| Type | | | Str | Y | Hosted/Packaged being a cloud webpage and a local webpage respectively, to be compatible with an original cloud page and retain a permission control capability |
| Resolution | | | Str | Y | Fhd/Hd differentiating resolutions for an application launching |
| Splash | | | {} | Y | information about a loading page for application launching |
| | Required | | bool | Y | whether to launch a splash function |
| | Background | | {} | N | |
| | | Image | Str | N | Background-Image Path, Must Be 16:9 |
| | | Backgroundcolor | Str | N | Background Color, RGB, Black By Default |
| | Icon | | {} | Y | Launching Icon Path |
| | | 128 | | Y | Launching Icon Size 128 |
| | | 256 | | N | Launching Icon Size 256, May Be Set Freely |
| Permissions | | | [] | N | Array |
| | Name | | | N | Specific Permission Name. For invoking of some important functions of system, the application must apply for them in manifest for use |
| Pages | | | {} | N | |
| | Index | | Str | N | Entrance Page Information, Default to index.html In Application Root Directory |
| | Deeplinking | | Str | N | Invoked Page Address When Deeplinking To This Application |
| manifest_version | | | Int | N | Packaging Application Version, Generated By Packaging Application, Tentatively Set As 1 |

Fig. 5

PAGE LOADING METHOD AND DISPLAY APPARATUS

The present disclosure is a continuation application of International Application No. PCT/US2021/055004, filed on Oct. 14, 2021, which claims priorities to the Chinese Application No. 202011097232.5 filed Oct. 14, 2020, the Chinese Application No. 202011109971.1 filed on Oct. 16, 2020, and the Chinese Application No. 202011489349.8 filed on Dec. 16, 2020, which are incorporated herein by references in their entireties.

FIELD

The present application relates to the technical field of Internet, and in particular, to a page loading method and a display apparatus.

BACKGROUND

With the rapid development of display apparatuses, the display apparatuses may have more and more functions and more and more powerful performance. At present, the display apparatuses include smart televisions, smart set-top boxes, smart boxes, products with smart display screens, and the like. Taking smart television as an example, several applications are integrated in the display apparatus for use by users in order to enrich the television experience of applications. Other than native applications such as Youtube, Netflix, and PrimeVideo, most of other applications are hosted in the cloud, and are run in a terminal browser.

SUMMARY

According to a first aspect, the present application provides a display apparatus, including: a display, configured for presenting a user interface; and a controller in connection with the display, where the controller is configured for: in response to an instruction for launching an application, obtaining a URL of the application, a code package of the application, and a URL of a loading page of the application; reading, from the code package, a loading parameter for enabling the loading page of the application to present display content, in response to the URL of the application being a target protocol URL; writing the loading parameter into the URL of the loading page to generate a new URL of the loading page; and presenting, on the display, the loading page including the display content corresponding to the loading parameter, based on the new URL of the loading page.

In some embodiments, the controller is further configured for reading, from the code package, the loading parameter for enabling the loading page of the application to present the display content by: reading an application description file of the application from the code package; and parsing the application description file to obtain the loading parameter for enabling the loading page of the application to present the display content.

In some embodiments, the controller is further configured for parsing the application description file to obtain the loading parameter for enabling the loading page of the application to present the display content by: parsing the application description file and storing all file contents obtained through parsing into a character string; if there is a field for indicating the loading parameter in the character string, parsing the character string and storing a parsing result to a data object, in which all file contents of the application description file is stored; and obtaining a target structural format corresponding to the field for indicating the loading parameter in the data object and determining the file content corresponding to the target structural format as the loading parameter.

In some embodiments, the target structural format includes a first-level structure, a second-level structure, and a third-level structure; and the controller is further configured for obtaining the target structural format corresponding to the field for indicating the loading parameter in the data object and determining the file content corresponding to the target structural format as the loading parameter by: determining whether the target structural format for the field for indicating the loading parameter is the first-level structure; if the target structural format is the first-level structure, determining the file content corresponding to the first-level structure as the loading parameter; if the target structural format is not the first-level structure, determining whether the target structural format for the field for indicating the loading parameter is the second-level structure; if the target structural format is the second-level structure, determining the file content corresponding to the second-level structure as the loading parameter; and if the target structural format is not the second-level structure, determining the file content corresponding to the third-level structure as the loading parameter.

In some embodiments, the controller is further configured for determining the file content corresponding to the second-level structure as the loading parameter by: obtaining the file content in the first-level structure corresponding to the field for indicating the loading parameter; and obtaining, from the file content in the first-level structure, the file content in the second-level structure corresponding to the field for indicating the loading parameter, and determining the file content in the second-level structure as the loading parameter.

In some embodiments, the controller is further configured for determining the file content corresponding to the third-level structure as the loading parameter by: obtaining the file content in the first-level structure corresponding to the field for indicating the loading parameter; obtaining, from the file content in the first-level structure, the file content in the second-level structure corresponding to the field for indicating the loading parameter; and obtaining, from the file content in the second-level structure, the file content in the third-level structure corresponding to the field for indicating the loading parameter, and determining the file content in the third-level structure as the loading parameter, where the third-level structure is the target structural format for the field for indicating the loading parameter.

In some embodiments, the controller is further configured for: loading an application display page of the application in the background when presenting the loading page on the display; and presenting the application display page of the application on the display when a display duration of the loading page reaches a preset duration, and cancelling presentation of the loading page.

In some embodiments, the controller is configured for loading the application display page of the application in the background by: parsing the URL of the application to obtain a designated launching action, an APPID, and an APP parameter that correspond to the application; obtaining an index configuration file of the application, and searching the index configuration file for an APPURL corresponding to the APPID, where the APPURL is configured to indicate a real access path by which the application is stored in the display apparatus; parsing an application description file of the application, and determining designated access page information of the application corresponding to the designated launching action;

and packaging the APP parameter, the APPURL, and the designated access page information into a file protocol URL, and loading the application display page of the application in the background based on the file protocol URL.

In some embodiments, the controller is further configured for obtaining the code package of the application by: generating a download request for downloading the code package of the application, sending the download request to a cloud server, and presenting a code package downloading page showing a downloading progress bar on the display, where the download request is used to instruct the cloud server to return the code package of the application; and locally storing the code package of the application returned from the cloud server, when the downloading progress bar is in a completed state.

According to a second aspect, the present application further provides a method for loading a loading page of an application, where the method includes: in response to an instruction for launching the application, obtaining a URL of the application, a code package of the application, and a URL of a loading page of the application; reading, from the code package, a loading parameter for enabling the loading page of the application to present display content, in response to the URL of the application being a target protocol URL; writing the loading parameter into the URL of the loading page to generate a new URL of the loading page; and presenting, on a display, the loading page including the display content corresponding to the loading parameter, based on the new URL of the loading page.

According to a third aspect, the present application provides another display apparatus, including: a display; and a controller, configured to: in response to an instruction for interaction between a browser application and a system platform, send the instruction for interaction to a network server through a network client, so that the network server is interconnected with the system platform and sends feedback information from the system platform to the network client; and send the feedback information to the browser application through the network client.

In some embodiments, the instruction for interaction includes an instruction for obtaining a system parameter or an operation instruction for a system function.

In some embodiments, the controller is further configured to send the instruction for interaction to the network server through the network client by: invoking a HTTP sending port of the network client, so that the HTTP sending port converts the instruction for interaction to a format of network communications for being sent to the network server.

In some embodiments, the controller is further configured to send the feedback information to the browser application through the network client by: invoking a HTTP receiving port of the network client, so that the HTTP receiving port receives the feedback information from the network server; and invoking a HTTP parsing port of the network client, so that the HTTP parsing port parses the feedback information and sends a parsing result to the browser application.

According to a fourth aspect, the present application provides another display apparatus, including: a display; and a controller, configured to: in response to an instruction for obtaining a system parameter, send the instruction for obtaining the system parameter to a network server through a network client, so that the network server is interconnected with a system platform and sends the system parameter information returned from the system platform to the network client; and send the returned system parameter information to a browser application through the network client.

According to a fifth aspect, the present application provides another display apparatus, including: a display; and a controller, configured to: in response to an operation instruction for a system function, send the operation instruction to a network server through a network client, so that the network server is interconnected with a system platform and sends an execution result of the operation instruction returned from the system platform to the network client; and send the execution result to a browser application through the network client.

According to a sixth aspect, the present application further provides a method for interaction between a browser application and a system platform, including: in response to an instruction for interaction between the browser application and the system platform, sending the instruction for interaction to a network server through a network client, so that the network server is interconnected with the system platform and sends feedback information from the system platform to the network client; and sending the feedback information to the browser application through the network client.

According to a seventh aspect, the present application further provides a method for obtaining a system parameter, including: in response to an instruction for obtaining a system parameter, sending the instruction for obtaining the system parameter to a network server through a network client, so that the network server is interconnected with a system platform and sends the system parameter information returned from the system platform to the network client; and sending the system parameter information to a browser application through the network client.

According to an eighth aspect, the present application further provides a method for performing system function operations, including: in response to an operation instruction for a system function, sending the operation instruction to a network server through a network client, so that the network server is interconnected with a system platform and sends an execution result of the operation instruction returned from the system platform to the network client; and sending the execution result to a browser application through the network client.

According to a ninth aspect, the present application provides another display apparatus, including: a controller, configured for: in response to an instruction for launching a web application sent from a browser, sending relevant information of a web application and the display apparatus to a server; receiving an interface file, returned from the server, generated based on the relevant information of the web application and the display apparatus, where the interface file is used to determine use permission and a parameter of a target interface that needs to be invoked by the web application; and controlling the browser to load the interface file, so that the web application invokes the target interface.

In some embodiments, the controller is further configured for: in response to the instruction for launching the web application sent from the browser, sending a WebSocket connection request to the server, where the WebSocket connection request is used to indicate that the display apparatus requests to establish a connection with the server for full-duplex communications on a single TCP connection; establishing a WebSocket connection with the server upon receiving a connection response sent back from the server; and initiatively sending relevant information of the web application and the display apparatus to the server.

In some embodiments, the controller is further configured for: as for configuration content of a system version of the display apparatus, storing interface information corresponding to a current system version in the server, where the interface information is used to indicate set content and permission content of the display apparatus corresponding to all interfaces in the current system version.

In some embodiments, the controller is further configured for: obtaining system version information about the display apparatus and interface requirements information about a web application currently to be launched, where the interface requirements information is used to indicate information about the target interface that needs to be invoked by the web application; and sending the system version information and the interface requirements information to the server.

In some embodiments, the controller is further configured for: storing the interface file in a preset browser directory, where read/write permission of the browser directory is open merely to an interface invoking operation of the current web application; and controlling the browser to automatically load the interface file in the browser directory, so that the web application invokes the target interface.

According to a tenth aspect, the present application provides a server, including: a controller, configured for: receiving relevant information of a web application and a display apparatus sent from the display apparatus; based on the relevant information and pre-stored interface information corresponding to a current system version of the display apparatus, generating an interface file required for invoking a target interface on the display apparatus, where the interface file is used to determine use permission and a parameter of the target interface; and sending the interface file back to the display apparatus, so that a browser on the display apparatus loads the interface file and the web application invokes the target interface.

In some embodiments, the controller is further configured for: receiving a WebSocket connection request sent from the display apparatus, where the WebSocket connection request is a request sent from the display apparatus in response to an instruction for launching a web application sent from the browser, and the WebSocket connection request is used to indicate that the display apparatus requests to establish a connection with the server for full-duplex communication connections on a single TCP connection; and sending a connection response back to the display apparatus, to establish a WebSocket connection with the display apparatus.

In some embodiments, the controller is further configured for: based on the relevant information, analyzing a system version of the display apparatus and the target interface that needs to be invoked by the web application currently to be launched; finding interface information of the target interface based on the system version and the target interface; and generating the interface file corresponding to the target interface based on the interface information.

According to an eleventh aspect, the present application further provides an interface invoking method for a web application in a display apparatus, including: in response to an instruction for launching a web application sent from a browser, sending relevant information of the web application and the display apparatus to a server; receiving an interface file, returned from the server, generated based on the relevant information of the web application and the display apparatus, where the interface file is used to determine use permission and a parameter of a target interface that needs to be invoked by the web application; and controlling the browser to load the interface file, so that the web application invokes the target interface.

According to a twelfth aspect, the present application further provides an interface invoking method for a web application in a server, including: receiving relevant information of the web application and a display apparatus sent from the display apparatus; based on the relevant information and pre-stored interface information corresponding to a current system version of the display apparatus, generating an interface file required for invoking a target interface on the display apparatus, where the interface file is used to determine use permission and a parameter of the target interface; and sending the interface file back to the display apparatus, so that a browser on the display apparatus loads the interface file and the web application invokes the target interface.

According to a thirteenth aspect, a computer-readable non-volatile storage medium is provided, including instructions, where when the instructions execute on a device, the device is enabled to implement any one of the foregoing methods. A computer program product is further provided, where when the computer program product runs on a device, the device is enabled to implement any one of the foregoing methods.

BRIEF DESCRIPTION OF THE DRAWINGS

FIG. 5 is a schematic diagram illustrating content of an application description file according to some embodiments.

DETAILED DESCRIPTION OF THE EMBODIMENTS

In order to make objectives and implementations of the present application more clear, the exemplary implementations of the present application are clearly and completely described below with reference to the accompanying drawings for the exemplary embodiments of the present application. Obviously, the described exemplary embodiments are merely some and not all of embodiments of the present application.

It should be noted that brief descriptions of the terms in the present application are merely for ease of understanding the implementations described below, and are not intended to limit the implementations of the present application. Unless otherwise stated, these terms should have common and ordinary meanings as understood by one of ordinary skilled in the art.

The terms such as "first", "second", and "third" in the description, claims, and the foregoing accompanying drawings of the present application are used for distinguishing similar or same objects or entities, and are not necessarily used to mean a specific sequence or a sequential order, unless otherwise noted. It should be understood that such terms herein may be used interchangeably in suitable cases.

Figure 1:
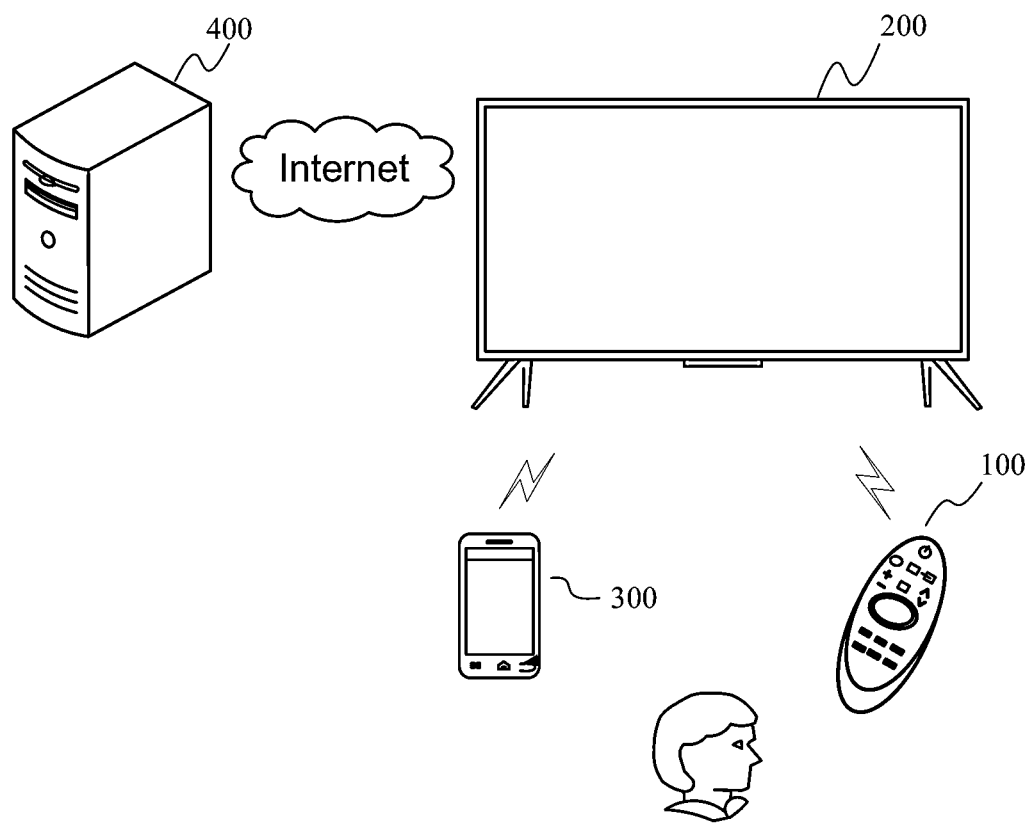
FIG. 1 shows a use scenario of a display apparatus according to some embodiments.

FIG. 1 shows a use scenario of a display apparatus according to some embodiments. As shown in FIG. 1, a display apparatus 200 performs data communications with a server 400, and a user may operate the display apparatus 200 by a smart device 300 or a control device 100.

In some embodiments, the control device 100 may be a remote controller. A manner of communications between the remote controller and the display apparatus includes infrared protocol communication or Bluetooth protocol communication, and at least one of other short-distance communication manners, so that the display apparatus 200 may be controlled in a wireless or wired way. The user may control the display apparatus 200 by inputting a user command by at least one of key input on the remote control, voice input, and control-panel input.

In some embodiments, the smart device 300 may include any one of a mobile terminal, a tablet, a computer, a notebook, and an AR/VR device.

In some embodiments, the display apparatus 200 may also be controlled through the smart device 300. For example, the display apparatus 200 is controlled through an application running on the smart device.

In some embodiments, data communications may also be performed to the display apparatus through the smart device 300.

In some embodiments, the display apparatus 200 may be controlled through other manners other than the control device 100 and the smart device 300. For example, the display apparatus 200 may be controlled by directly receiving a voice command from the user through a voice instruction obtaining module provided within the display apparatus 200, or may be controlled by receiving a voice command from the user through a voice control device provided outside the display apparatus 200.

In some embodiments, the display apparatus 200 also performs data communications with the server 400. The display apparatus 200 may be allowed to perform communications connections through a local area network (LAN), a wireless local area network (WLAN), and other networks. The server 400 may provide various contents and interactions for the display apparatus 200. The server 400 may be a cluster or a plurality of clusters, and may include one or multiple types of servers.

In some embodiments, as required, software steps executed by one body may be migrated to another body, that performs data communications with the former, for execution. For example, as required, software steps executed by the server may be performed by the display apparatus, that performs data communications with the server, and vice versa.

Figure 2:
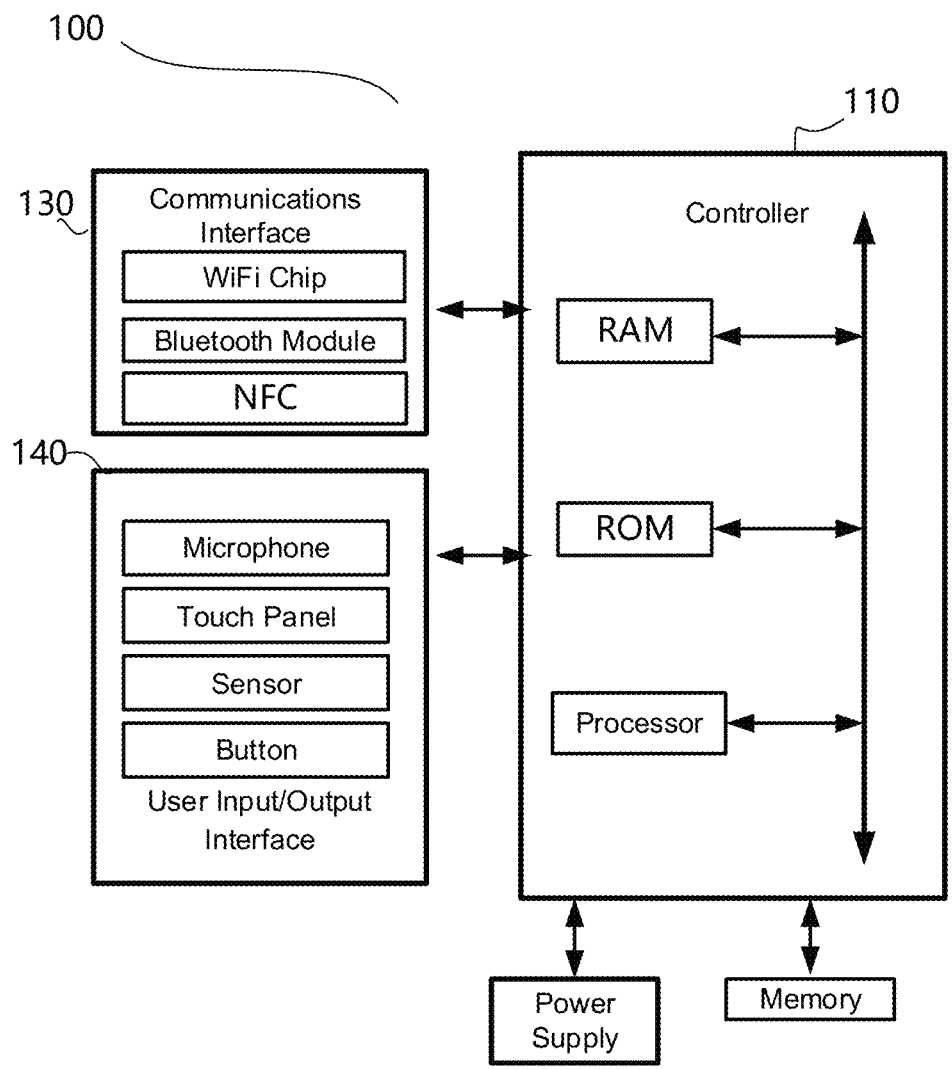
FIG. 2 is a block diagram illustrating a hardware configuration of a control device 100 according to some embodiments.

FIG. 2 is a block diagram illustrating a hardware configuration of a control device 100 according to some embodiments. As shown in FIG. 2, the control device 100 includes a controller 110, a communications interface 130, a user input/output interface 140, a memory, and a power supply. The control device 100 may receive a command input from the user, and convert the command into an instruction that the display apparatus 200 can recognize and respond to, serving as an intermediary for interactions between the user and the display apparatus 200.

In some embodiments, the communications interface 130 is configured for communicating with the outside, and includes a WIFI chip, a Bluetooth module, an NFC, or at least one of alternative modules.

In some embodiments, the user input/output interface 140 includes a microphone, a touch panel, a sensor, a button, or at least one of alternative modules.

Figure 3:
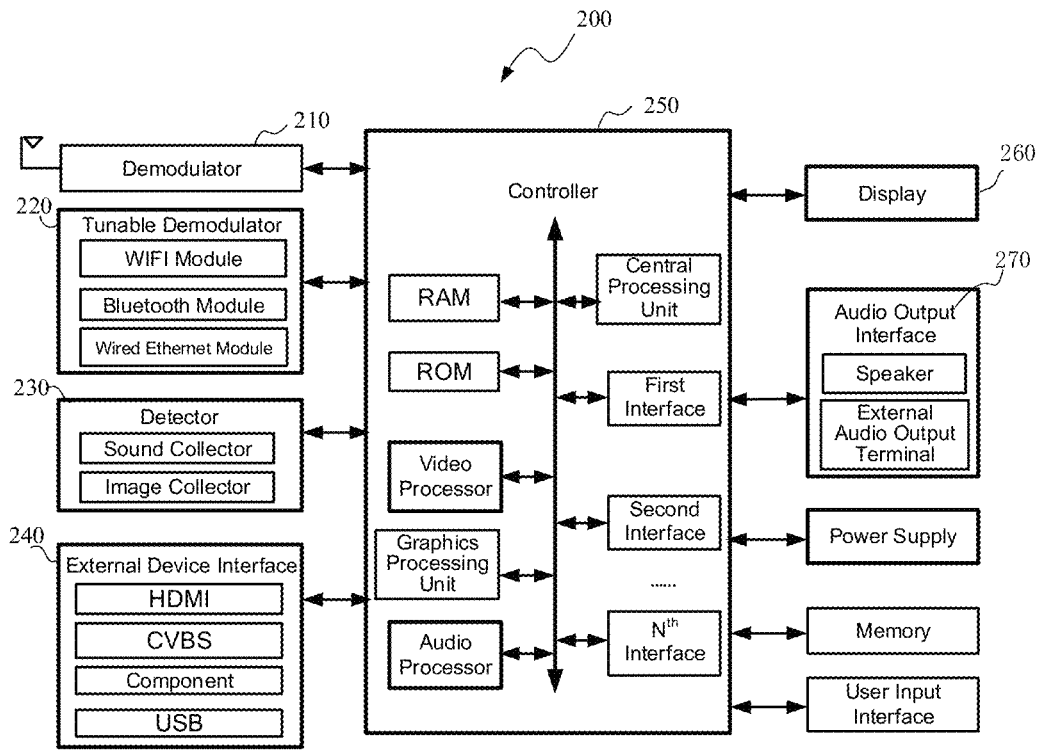
FIG. 3 is a block diagram illustrating a hardware configuration of a display apparatus 200 according to some embodiments.

FIG. 3 is a block diagram illustrating a hardware configuration of a display apparatus 200 according to some embodiments. With reference to FIG. 3, in some embodiments, the display apparatus 200 includes at least one of a demodulator 210, a communicator 220, a detector 230, an external device interface 240, a controller 250, a display 260, an audio output interface 270, a memory, a power supply, and a user input interface.

In some embodiments, the controller includes a central processing unit, a video processor, an audio processor, a graphics processing unit, a RAM, a ROM, and a first interface to a $n^{th}$ interface for input/output.

In some embodiments, the display 260 includes a panel component for presenting images and a driving component for driving image display, and is configured to receive image signals output from the controller to display video content, image content, components on a menu control interface, and a user-control UI interface.

In some embodiments, the display 260 may be at least one of a liquid crystal display, an OLED display, and a projection display, and may alternatively be a projection apparatus and a projection screen.

In some embodiments, the demodulator 210 receives a broadcast television signal in a wired or wireless way, and demodulates audio and video signals, such as EPG data signals, from a plurality of wirelessly or wiredly received broadcast television signals.

In some embodiments, the communicator 220 is a component for communicating with an external device or a server according to various communication protocol types. For example, the communicator may include at least one of a WiFi module, a Bluetooth module, a wired Ethernet module, or a near-field communication protocol chip, and an infrared receiver. Through the communicator 220, the display apparatus 200 may send or receive control signals and data signals to or from the control device 100 or the server 400.

In some embodiments, the detector 230 is configured to acquire a signal from an external environment or a signal interacting with the outside. For example, the detector 230 includes a light receiver, and a sensor configured to acquire intensity of ambient light. Alternatively, the detector 230 includes an image collector, such as a camera; and may be configured to collect external environment scenes, user attributes, or gestures of user interactions. Furthermore, the detector 230 may include a sound collector, such as a microphone, configured to receive sound from external.

In some embodiments, the external device interface 240 may include, but not limited to any one or more of a high definition multimedia interface (HDMI), an analog or data high-definition component input interface (component), a composite video broadcast signal input interface (CVBS), a USB input interface (USB), a RGB port, and the like, or may be a composite input/output interface formed by a plurality of the foregoing interfaces.

In some embodiments, the controller 250 and the demodulator 210 may be located in different separate devices. To be specific, the demodulator 210 may be in an external device of a main device where the controller 250 is located, such as an external set-top box.

In some embodiments, the controller 250 controls operation of the display apparatus and responds to operations from the user through various software control programs stored in the memory. The controller 250 controls overall operations of the display apparatus 200. For example, in response to a user command for selecting a UI object for displaying on the display 260, the controller 250 may perform operations related to the object selected by the user command.

In some embodiments, the object may be any one of selectable objects, such as a hyperlink, an icon, or other controls available for operation. The operations related to the selected object include operations of displaying a page, a document, an image, and the like that are linked to a hyperlink, or operations of executing an application corresponding to the icon.

In some embodiments, the controller includes at least one of a central processing unit (CPU), a video processor, an audio processor, a graphics processing unit (GPU), a random access memory (RAM), a read-only memory (ROM), the first interface to the $n^{th}$ interface for input/output, and a communications bus.

The CPU is configured to execute an operating system and application instructions that are stored in the memory, and execute various applications, data, and content based on various interaction instructions input from the outside, to finally display and play various audio and video content. The CPU may include a plurality of processors. For example, the CPU includes a main processor and one or more sub-processors.

In some embodiments, the graphics processing unit is configured to generate various graphics objects, for example, at least one of an icon, an operation menu, and a graphic displayed based on a user input instruction. The graphics processing unit includes an arithmetic unit, to perform operations by receiving various interaction instructions input from the user, and display various objects according to display attributes; and further includes a renderer, to render various objects obtained through the arithmetic unit. The rendered object is displayed on the display.

In some embodiments, the video processor is configured to receive an external video signal, and perform video processings according to a standard coding/decoding protocol of the input signal so that a signal, that can be directly displayed or played on the display apparatus 200, may be obtained.

In some embodiments, the video processor includes at least one of a demultiplexing module, a video decoding module, an image synthesis module, a frame rate conversion module, and a display formatting module. The demultiplexing module is configured to demultiplex an input audio/video data stream. The video decoding module is configured for processing a demultiplexed video signal, including decoding, scaling, and the like. The image synthesis module, such as an image synthesizer, is configured to superimpose and mix a GUI signal generated by a graphic generator and a scaled video image according to user inputs, to generate an image signal for display. The frame rate conversion module is configured to convert frame rate of an input video. The display formatting module is configured to convert a received video output signal after frame rate conversion into a signal conforming to a display format, for example, to output a RGB data signal.

In some embodiments, the audio processor is configured to receive an external audio signal, and perform processing according to a standard coding/decoding protocol of the input signal to obtain a sound signal that can be played in a speaker.

In some embodiments, the user may input a user command based on a graphical user interface (GUI) displayed on the display 260, and a user input interface may receive the input user command through the graphical user interface (GUI). Alternatively, the user may input a user command by inputting specific sound or a specific gesture, and the user input interface may recognize the sound or the gesture through the sensor, to receive the input user command.

In some embodiments, the "user interface" refers to a medium interface for interactions and information exchange between an application or operating system and a user, implementing conversion between an internal form and a user-acceptable form of information. A common representation of the user interface is in a form of a graphical user interface (GUI), which refers to a user interface displayed in a form of graphics and related to computer operations. The user interface may be an interface element displayed on a display screen of an electronic device, such as an icon, a window, or a control. The control may include at least one of visual interface elements such as an icon, a button, a menu, a tab, a text box, a dialog box, a status bar, a navigation bar, and a widget.

In some embodiments, the user input interface is an interface that can be configured to receive control input (for example, a physical button on a display apparatus body, or the like).

In some embodiments, a system of the display apparatus may include a kernel, a command parser (shell), a file system, and applications. The kernel, the shell, and the file system together form a basic operating system structure, and allow the user to manage files, run applications, and use the system. After being powered on, the kernel is started; kernel space is activated; hardware is abstracted; hardware parameters and the like are initialized; and a virtual memory, a scheduler, a signal, and inter-process communication (IPC) are run and maintained. After the kernel is started, the shell and a user application are loaded. After being launched, the application is compiled into machine codes to form a process.

Figure 4:
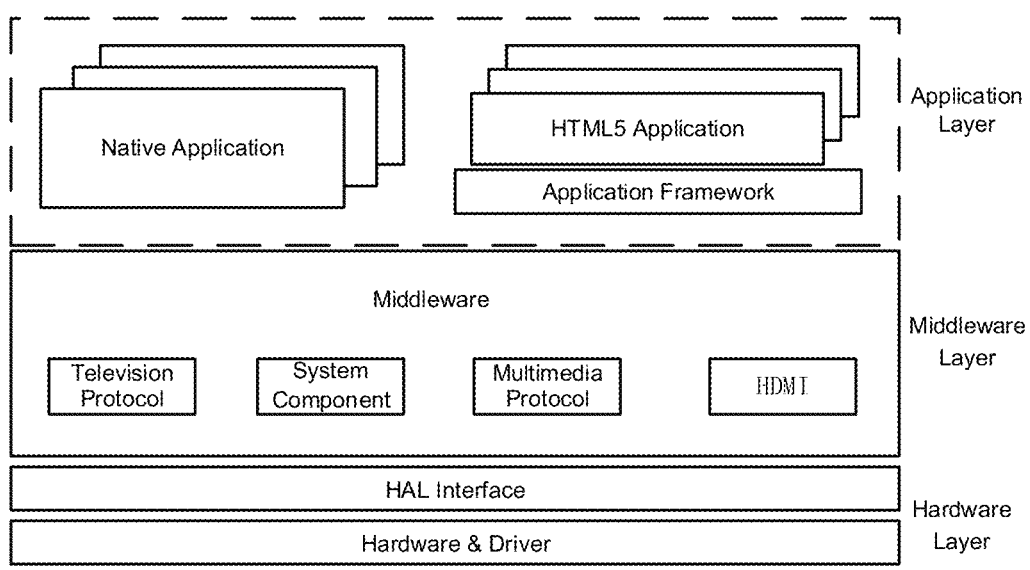
FIG. 4 is a diagram illustrating a software configuration of a display apparatus according to some embodiments.

FIG. 4 is a diagram illustrating a software configuration of a display apparatus according to some embodiments. As shown in FIG. 4, the display apparatus system is divided into three layers, an application layer, a middleware layer and a hardware layer from top to bottom, respectively.

The application layer mainly includes commonly used applications on a television, and an application framework. The commonly used applications are mainly applications developed based on a browser, such as HTML5 APPs; and native applications (native APPs).

The application framework is a complete program model that has all basic functions required by standard application software, such as file access, data exchange . . . , and interfaces (a toolbar, a status bar, a menu, and a dialog box) accessible to these functions.

The native applications (native APPs) can support online or offline message pushing or local resource access.

The middleware layer includes middleware such as various television protocols, multimedia protocols, and system components. The middleware may use basic services (functions) provided by the system software to connect all parts of an application system or different applications on a network, thus achieving resource sharing and function sharing.

The hardware layer mainly includes an HAL interface, hardware, and drivers. The HAL interface is a unified interface for connecting with any television chip, where specific logic is implemented by the respective chip. The drivers mainly include an audio driver, a display driver, a Bluetooth driver, a camera driver, a WIFI driver, a USB driver, a HDMI driver, a sensor driver (for example, a fingerprint sensor, a temperature sensor, a pressure sensor, or the like), a power supply driver, and the like.

In some embodiments, the display apparatus may be connected to a server, that is, the display apparatus is installed with a system to implement network television functions. When implementing the network television functions, several applications are integrated in the display apparatus for use by users in order to enrich television experience of applications. Other than native applications such as Youtube, Netflix, and PrimeVideo, most of other applications are hosted in the cloud, and are run in a terminal browser.

Various applications are installed in the display apparatus with a system, and all applications of the system are managed based on URLs. The applications are provided for the display apparatus through an application vendor, and each application corresponds to an application package.

However, prior display apparatus does not locally storing a code package of the application, but stores only a hypertext transfer protocol (HTTP) URL of the application. Therefore, when launching an application, the display apparatus typically first downloads the HTTP URL, and then launches the corresponding application based on the HTTP URL. This launching manner is an "instant-launching, instant-loading" manner, where it is slow to load, and launching cannot be performed offline.

However, for a plurality of applications that need to be maintained in the display apparatus, each of the applications needs to be launched individually, and thus all of the applications in the display apparatus cannot be managed in a unified way, resulting in low management efficiency.

When the display apparatus launches the application, a process of waiting for loading of application data is a blank period due to a URL downloading process going first. Typically, a loading circle may be displayed on a display for shielding an application loading process. However, the loading circle is merely a pattern with a word "Loading". Since display content is not rich, a user experience of loading is not good.

Therefore, in order to provide better contents for a user while the user waits for loading when the display apparatus loads an application, a loading page, with contents such as a picture, a video, and recommendation information being presented therein, may be displayed on the display during the loading.

In some embodiments, the content presented in the loading page may derive from the code package of the application. Therefore, it is needed that the application vendor provides the code package of the application to the display apparatus. In addition to running code of the corresponding application, the code package includes an application description file (for example, a manifest.json file) storing configuration information of the application, and contents required for loading the loading page, such as pictures, videos, and recommendation information.

FIG. 5 is a schematic diagram illustrating contents of an application description file according to some embodiments. The application description file is in a Json format, and has contents including but not limited to the contents shown in FIG. 5. Referring to FIG. 5, the application description file has three structural formats including a first-level structure, a second-level structure and a third-level structure. Each of the structural formats may correspond to a plurality of configuration information, such as an application package name (pkgname), an application name (appname), an application version name (version), a loading-page loading parameter, and the like. Information within each of the structures may realize at least one function.

Based on the code package of each application, the display apparatus may obtain a loading-page loading parameter from the code package. The loading-page loading parameter is presented on a loading page, so that the display apparatus presents a loading page with information such as pictures, videos, and the like on the display when the application is being launched, enriching display content of a page while waiting for the loading of the application and improving loading experience.

Meanwhile, the display apparatus manages the applications in a unified way based on the code package, develops a code package-management mechanism for front-end code originally running in the cloud, and safely loads and runs the code package on the display apparatus by means of downloading from an application store. The display apparatus defines, based on the information in the code package, URLs of the application as a file protocol URL in a unified way for invoking, and constructs a complete application control and Deeplink mechanism. A version cannot be arbitrarily updated any longer, and needs to be provided to the display apparatus for approval, thereby improving loading performance of the application and improving management efficiency.

Figure 6:
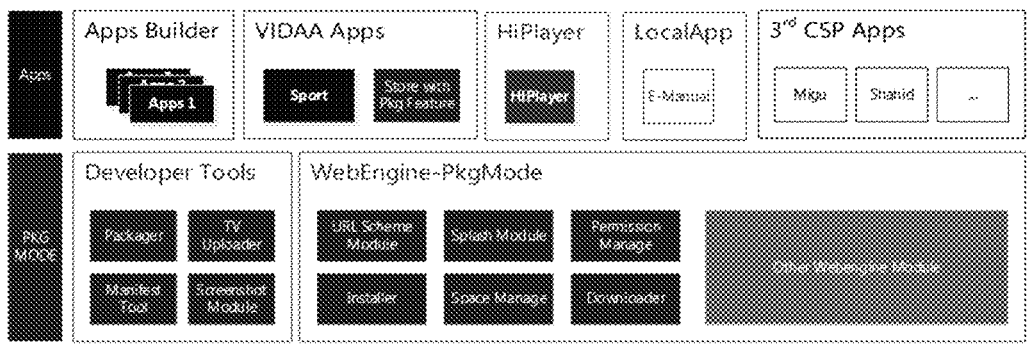
FIG. 6 is a schematic diagram illustrating a management architecture of a code package of the application according to some embodiments.

FIG. 6 is a schematic diagram illustrating a management architecture of a code package of the application according to some embodiments. Referring to FIG. 6, when managing a code package of an application, a display apparatus includes an Apps layer and a PKG mode layer. The Apps layer is of an APP type supported by the code package-management mechanism, covering all pre-installed APPs and applications (such as media resource applications and game applications) including APPs, HiPlayer, and E-Manual.

The PKG mode layer is a module developed for the present mechanism, and includes a package management module (PkgMode), a package operating environment module (WebEngine), and a package development environment module Developer Tools. The package management module includes Installer, Space Manage, and Downloader and is responsible for installing, updating, and downloading of the package. The package operating environment module includes a unified scheme package (URL Scheme Module), a splash optimization part (Splash Module), and permission management (permission manage). The package development environment module includes a package structure (packager), a TV interface for directly uploading and debugging (a TV uploader), a packaging tool (Manifest Tool), and other parts.

After the code package-management mechanism proposed by the display apparatus is implemented, use of an original application is not affected, and a series of applications, such as a series of APP, HiPlayer, E-Manual, and CSP applications, are supported to be locally launched; application launching experience and application launching performance may be optimized, and offline applications are supported; and package structures are unified, a packaging tool and a debugging tool are provided, and tampering of package may be recognized. A unified scheme is supported, that is, URLs of the applications are defined as a file protocol URL in a unified way, to improve application loading efficiency. A unified Deeplinking scheme is supported. An application vendor uploads the corresponding code package to a cloud application store, and the display apparatus obtains the code package of a corresponding application from the cloud application store, to get native-like application store experience.

In view of the above, after the display apparatus obtains the code package of the application, the applications may be managed in a unified way based on the configuration information in the code package, thereby improving management efficiency.

In some embodiments, an application scenario where the display apparatus invokes the code package of the application for unified management is: when the display apparatus launches the application, to provide the user with richer content display, a loading-page loading parameter in the code package may be displayed on a loading page of the application, to optimize use experience while waiting for application data to be loaded.

Figure 7:
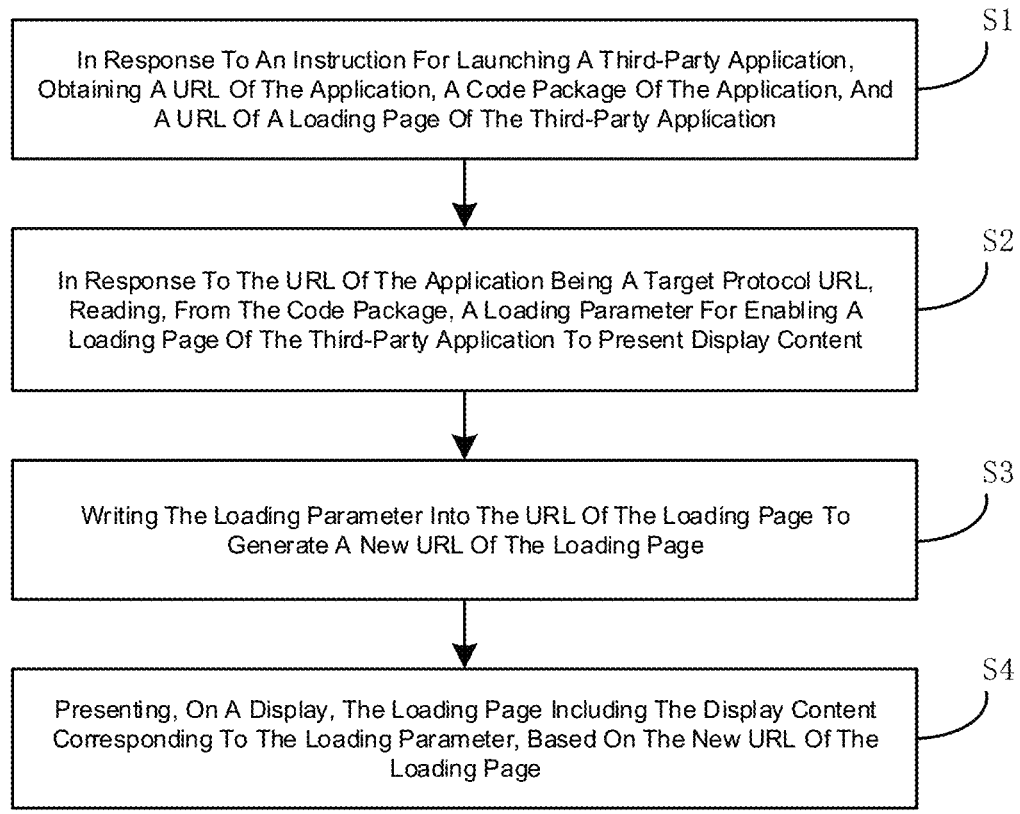
FIG. 7 is a flowchart of a method for loading a page of an application according to some embodiments.
Figure 8:
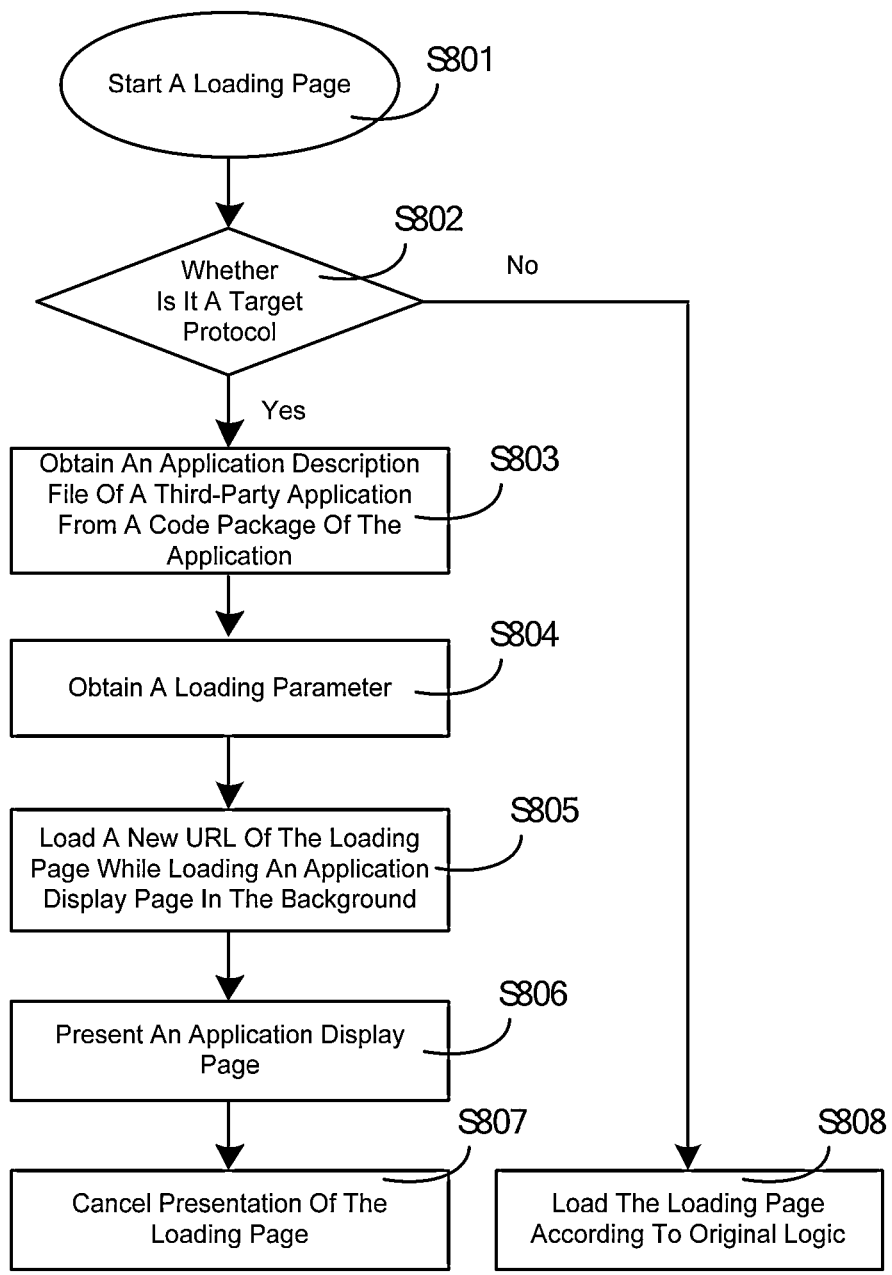
FIG. 8 is a data flow diagram illustrating a method for loading a page of an application according to some embodiments.

FIG. 7 is a flowchart of a method for loading a loading page of an application according to some embodiments. FIG. 8 is a data flow diagram illustrating a method for loading a loading page of an application according to some embodiments. An embodiment of the present application provides a display apparatus, including: a display, configured for presenting a user interface; and a controller in connection with the display. When loading an application and presenting a loading page with richer content by using a code package of the application, referring to FIG. 7 and FIG. 8, the controller is configured for performing the following steps.

S1. In response to an instruction for launching an application, obtaining a URL of the application, a code package of the application, and a URL of a loading page of the application.

When a user launches an application configured in the display apparatus, the display apparatus uses a browser to launch the application to obtain the application. For launching, the user may issue a command by triggering a button on a remote control to launch a designated application.

When loading the application, the loading page may be displayed on the display. Moreover, in order to enrich display content of the loading page, the URL of the application, the code package, and the URL of the loading page of the application may be obtained. The URL of the application refers to a URL for launching the application. In the system, the URL of the application is a URL using a protocol. Running codes and configuration information (an application description file and the like) of the application are packaged in the code package. The URL of the loading page refers to a URL for starting the loading page.

The URL of the application and the URL of the loading page are provided by a system of the display apparatus. Generally, the URL of the application and the URL of the loading page of each application are stored in an application installation information file (AppInfo.json).

The code package is provided by an application vendor of the launched application, where the application vendor packages the code package of the corresponding application into a tar.gz format and uploads the same to an interface of a cloud application store (a cloud server). In addition to its own codes, the code package contains a manifest.json file storing configuration information thereof, and information required for loading the loading page, such as pictures and animations.

Therefore, in some embodiments, the controller is further configured for obtaining the code package of the application by: generating a download request for downloading the code package for the application, sending the download request to a cloud server, and presenting a code package downloading page showing a downloading progress bar on the display, where the download request is configured to instruct the cloud server to return the code package of the application; and when the downloading progress bar is in a completed state, locally storing the code package of the application returned from the cloud server.

After the application vendors upload a code package of the application of respective applications to the cloud server, the display apparatus correspondingly locally displays the interface of the cloud application store. The display apparatus may download a specific file, install a compressed package to a specific directory, and update a configuration index file of the application and an AppInfo.json file, to update and uninstall the application.

Referring to FIG. 8, the controller is configured for performing the following steps.

S801, Start a loading page.

S802, Determine whether is it a target protocol. If it is the target protocol, the flow goes to S803. If it is not the target protocol, the flow goes to S808.

S803, Obtain an application description file of a third-party application from a code package of the application.

S804, Obtain a loading parameter.

S805, Load a new URL of the loading page while loading an application display page in the background.

S806, Present an application display page.

S807, Cancel presentation of the loading page.

S808, Load the loading page according to original logic.

Figure 9:
FIG. 9 is a schematic diagram illustrating a display of an interface of a cloud application store according to some embodiments.
Figure 10:
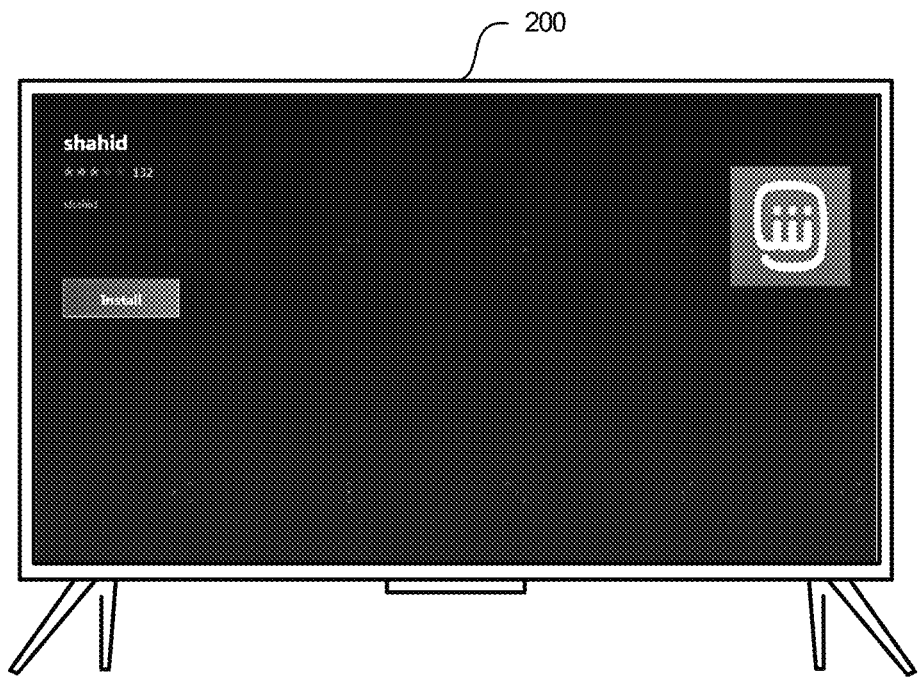
FIG. 10 is a schematic diagram illustrating a display of an application downloading interface according to some embodiments.

FIG. 9 is a schematic diagram illustrating a display of an interface of a cloud application store according to some embodiments. FIG. 10 is a schematic diagram illustrating a display of an application downloading interface according to some embodiments. Referring to FIG. 9 and FIG. 10, the interface of the cloud application store displays icons of various applications, and a user selects one of the plurality of applications displayed on the interface of the cloud application store, thus skipping to the application downloading interface. The user triggers an "install" button on the application downloading interface to generate an instruction for launching the application. The controller generates and sends a download request for downloading the code package of the application to the cloud server based on the instruction for launching the application, to obtain the code package of the application stored in the cloud server, and download the application to local device.

Figure 11:
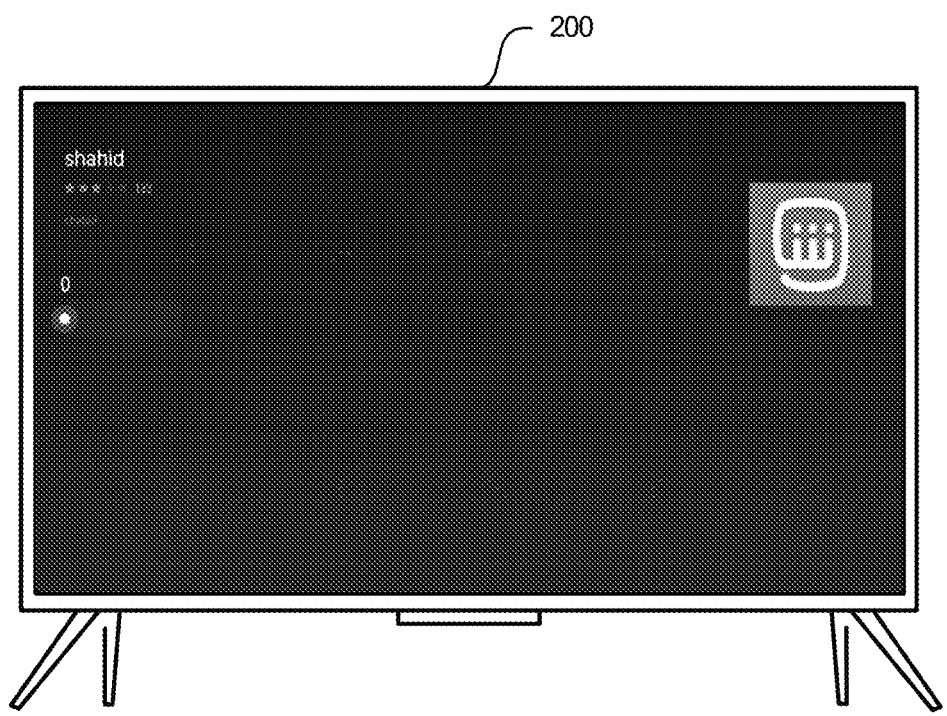
FIG. 11 is a schematic diagram illustrating a display of a code package downloading page when downloading starts according to some embodiments.
Figure 12:
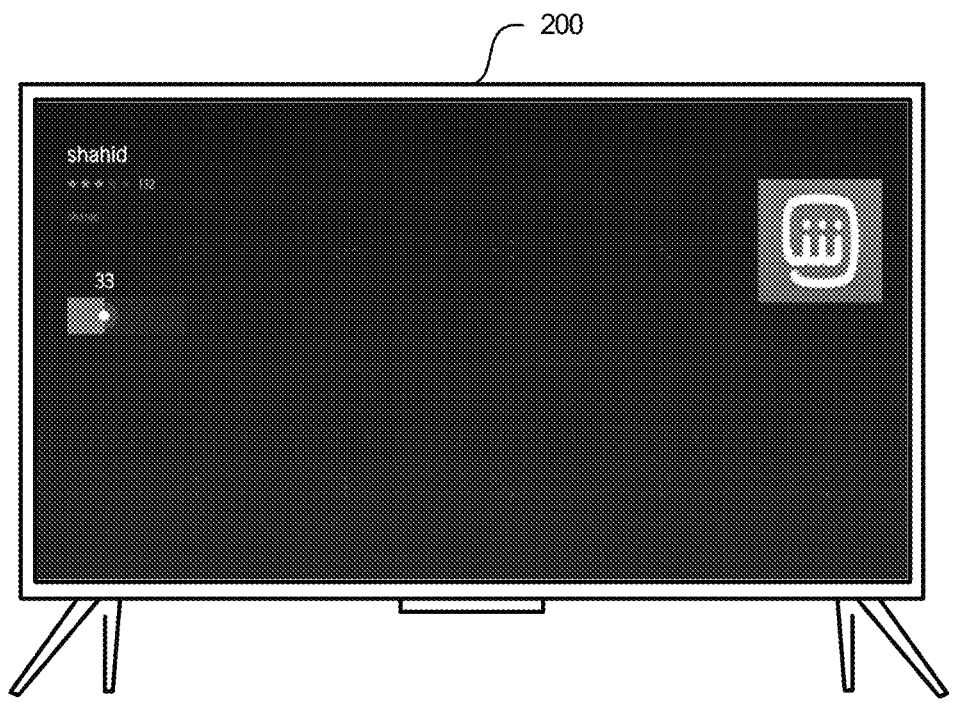
FIG. 12 is a schematic diagram illustrating a display of a code package downloading page during a downloading process according to some embodiments.

FIG. 11 is a schematic diagram illustrating a display of a code package downloading page when downloading starts according to some embodiments. FIG. 12 is a schematic diagram illustrating a display of a code package downloading page during a downloading process according to some embodiments. Meanwhile, on a display apparatus side, the code package downloading page is generated on the display, where a downloading progress bar displayed on the code package downloading page shows a progress of 0 when downloading starts, and the downloading progress bar shows a progress of 100 when downloading is completed.

The process of value increase on the downloading program bar is a process for the cloud server to search for a code package corresponding to the application launched by the user. When the downloading progress bar is in a completed state, it is indicated that the cloud server has found the code package of the application and has returned the code package to the display apparatus. At this time, the display apparatus obtains and locally stores the code package of the application returned from the cloud server.

Figure 13:
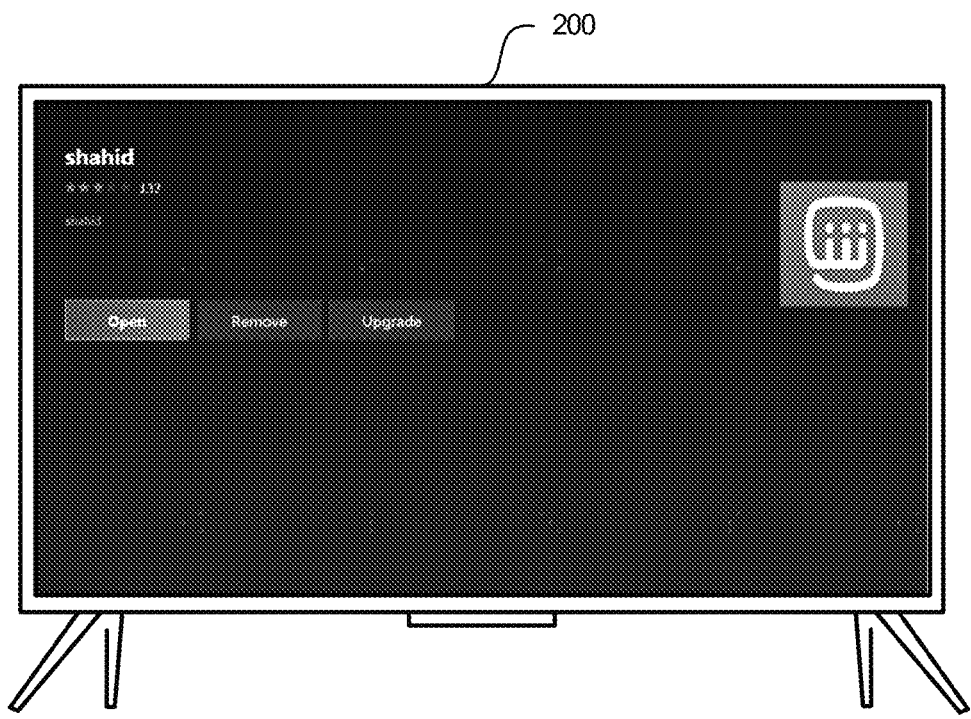
FIG. 13 is a schematic diagram illustrating a display of a code package downloading page when downloading is completed according to some embodiments.

FIG. 13 is a schematic diagram illustrating a display of a code package downloading page when downloading is completed according to some embodiments. Referring to FIG. 13, upon completion of the downloading of the code package of the application, an Open control, a Remove control, and an Upgrade control are generated on the code package downloading page. Upon completion of the downloading of the code package of the application, the application may be downloaded and installed. Moreover, after the application is downloaded, the application may be launched by clicking the Open control, may be removed by clicking the Remove control, and may be updated by clicking the Upgrade control.

For example, by clicking Remove, the locally stored code package may be deleted, along with configuration information of the application in the AppInfo.json file and index information of the application in mapindex.txt. By clicking Upgrade, a version of the application may be updated, where an original old version in the local may be deleted, a new version of application may be installed, and version information of the application in the AppInfo.json file and mapindex.txt may be updated.

After the URL of the application, the code package, and the URL of the loading page of the application are obtained according to the foregoing method, a code package-management mechanism may be implemented, to write one or more loading parameters of the loading page in the code package into the URL of the loading page, and load the loading page, thus obtaining a loading page with rich display content.

S2. In response to the URL of the application being a target protocol URL, reading, from the code package, a loading parameter for enabling the loading page of the application to present display content.

In some embodiments, in a certain system, a target protocol may be a certain protocol, and the target protocol URL may be a certain protocol URL. Therefore, after a URL of the application of a designated application is obtained, it is determined whether the URL of the application is a target protocol URL. In other words, when the designated application is launched, whether the URL of the application read from AppInfo.json is a customized protocol:// is determined. If the URL of the application is a target protocol URL, the loading parameter for enabling the loading page of the application to present the display content is read from the code package. If the URL of the application is not a target protocol URL, the loading page is loaded according to original logic, that is, only a loading circle is displayed.

The loading parameter for enabling the loading page of the application to present the display content is one or more loading parameters of the loading page stored in an application description file. Therefore, the application description file of the application may be obtained first, and then the one or more loading parameters are obtained.

In some embodiments, the controller is further configured for reading, from the code package, the one or more loading parameters for enabling the loading page of the application to present the display content by: reading an application description file of the application from the code package; and parsing the application description file to obtain the one or more loading parameters for enabling the loading page of the application to present the display content.

The application description file of the application is read from the code package, and the application description file (a manifestjson file) is parsed. Related fields, for example, resolution, index, appname, image, backgroundcolor in the manifest.json file, and the like are read to serve as the loading parameters.

A resolution of a main window, i.e., a resolution of an application display page, is configured based on the resolution field, where an adaptive resolution is supported. According to a configuration parameter in the manifestjson file, the corresponding loading page is loaded when the application is being launched, to present the loading page including rich content such as pictures, videos, or recommendation information. In some embodiments, the loading page is designed to be stored in /opt/webengine/resources/status_page/.

When obtaining the one or more loading parameters (splash field information) from the application description file, the controller is configured to invoke a JSPlugins interface in the package operating environment module to read the configuration information.

Figure 14:
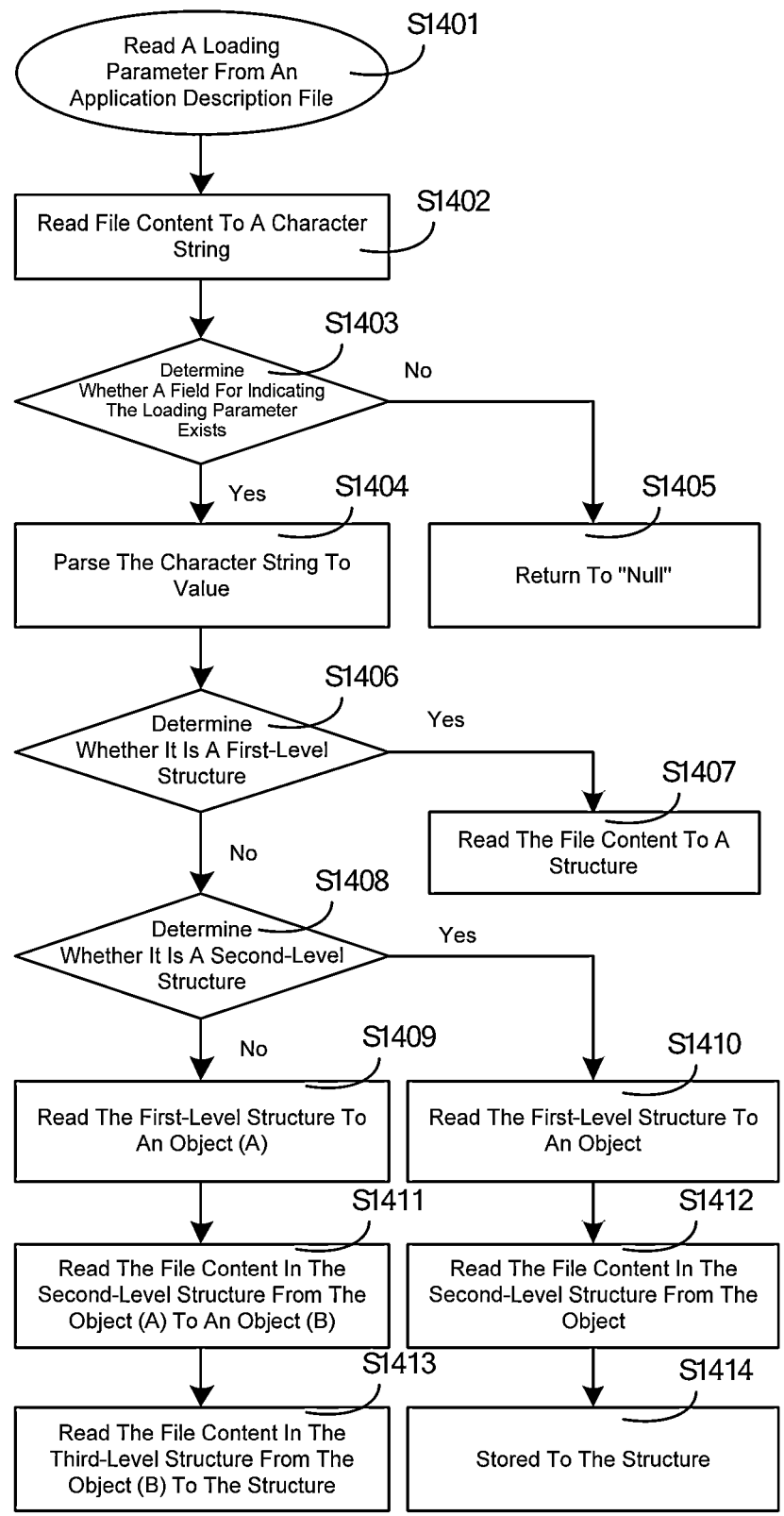
FIG. 14 is a diagram illustrating a data flow for obtaining a loading parameter according to some embodiments.

FIG. 14 is a diagram illustrating a data flow for obtaining a loading parameter of a loading page according to some embodiments. Referring to FIG. 14, in some embodiments, the controller is configured to parse the application description file to obtain a loading parameter for enabling the loading page of the application to present the display content by: parsing the application description file, and storing all file contents obtained through parsing into a character string; parsing the character string if there is a field for indicating a loading parameter in the character string, and storing a parsing result to a data object where all the file contents of the application description file is stored; and obtaining a target structural format corresponding to the field for indicating the loading parameter in the data object and determining a file content corresponding to the target structural format as the loading parameter.

The controller invokes the JSPlugins interface to read the splash field information from the application description file, parses the application description file to obtain all the file contents, and reads all the file contents obtained through parsing to a character string. Whether a field for indicating a loading parameter exists in the character string is determined. If the field for indicating the loading parameter does not exist, "NULL" is returned. If the field for indicating the loading parameter exists, the character string is parsed to value, wherein the value is used as a data object to store all the file contents of the application description file.

The data object is searched for the field for indicating the loading parameter. Since the application description file is in a Json format, the application description file includes three structural formats, which respectively are a first-level structure, a second-level structure, and a third-level structure. Therefore, it needs to determine whether a target structure format of the field for indicating the loading parameter is the first-level structure, the second-level structure, or the third-level structure, so that a parameter corresponding to the field for indicating the loading parameter can be obtained more accurately.

In some embodiments, the first-level structure>the second-level structure>the third-level structure, that is, the third-level structure is subordinate to the second-level structure, and the second-level structure is subordinate to the first-level structure. Therefore, in order to determine the target structure format of the field for indicating the loading parameter, it needs to determine the first-level structure, the second-level structure, and the third-level structure in order.

In some embodiments, the controller is further configured for obtaining a target structural format corresponding to the field for indicating the loading parameter in the data object and determining the file content corresponding to the target structural format as the loading parameter by: determining whether a target structural format for the field for indicating the loading parameter is a first-level structure; if the target structural format is the first-level structure, determining the file content corresponding to the first-level structure as the loading parameter of the loading page; if the target structural format is not the first-level structure, determining whether the target structural format for the field for indicating the loading parameter is a second-level structure; if the target structural format is the second-level structure, determining the file content corresponding to the second-level structure as the loading parameter; and if the target structural format is not the second-level structure, determining the file content corresponding to the third-level structure as the loading parameter.

According to the order for determining, it is first determined whether the target structural format for the field for indicating the loading parameter is the first-level structure (S1406). If the target structural format is the first-level structure, the file content corresponding to the first-level structure is stored to a structure, and the file content stored in that structure is determined as the loading parameter. The structure is a user-defined storage medium, and is configured to store the read file content, and return parameter data found, i.e., the loading parameter, to the controller later.

If the target structural format for the field for indicating the loading parameter is not the first-level structure, based on the order for determining, whether the target structural format for the field is the second-level structure is further determined. If the target structural format for the field for indicating the loading parameter is the second-level structure, the file content corresponding to the second-level structure is determined as the loading parameter.

However, the data in the application description file needs to be read a level structure by a level structure, that is, the data in the first-level structure needs to be read first, and then the data in the second-level structure is read from the data in the first-level structure. Therefore, in some embodiments, when determining the file content corresponding to the second-level structure as the loading parameter if the target structural format is the second-level structure, the controller may be further configured for: if a target structural format for the field for indicating the loading parameter is the second-level structure, obtaining the file content in the first-level structure corresponding to the field for indicating the loading parameter; and obtaining, from the file content in the first-level structure, the file content in the second-level structure corresponding to the field for indicating the loading parameter, and determining the file content in the second-level structure as the loading parameter.

When the target structural format for the field for indicating the loading parameter is the second-level structure, the file content in the first-level structure is read to an object, and the file content in the object is determined as the file content in the first-level structure corresponding to the field for indicating the loading parameter. The object is a storage medium defined in the controller, and is configured to temporarily store the file content read in the first-level structure.

The object is further searched for the file content corresponding to the field for indicating the loading parameter, that is, the file content in the first-level structure is searched for the file content corresponding to the field for indicating the loading parameter, and the file content found in the file content in the first-level structure is determined as the file content in the second-level structure.

The file content corresponding to the second-level structure is stored to a structure, and the file content in the second-level structure stored in the structure is determined as the loading parameter.

In some embodiments, if the target structural format for the field for indicating the loading parameter is not the second-level structure, it is indicated that the target structural format for the field for indicating the loading parameter is the third-level structure. In this case, the file content corresponding to the third-level structure is determined as the loading parameter. When reading the file content corresponding to the third-level structure, firstly the file content corresponding to the first-level structure and the second-level structure needs to be read sequentially, and the file content corresponding to the third-level structure is read from the file content in the second-level structure.

Therefore, if the target structural format is not the second-level structure, when determining the file content corresponding to the third-level structure as the loading parameter, the controller may be further configured for: if the target structural format for the field for indicating the loading parameter is not the second-level structure, obtaining the file content in the first-level structure corresponding to the field for indicating the loading parameter; obtaining, from the file content in the first-level structure, the file content in the second-level structure corresponding to the field for indicating the loading parameter; and obtaining, from the file content in the second-level structure, the file content in the third-level structure corresponding to the field for indicating the loading parameter, and determining the file content in the third-level structure as the loading parameter, where the third-level structure is the target structural format for the field for indicating the loading parameter.

When the target structural format for the field for indicating the loading parameter is not the second-level structure, the target structural format for the field for indicating the loading parameter is the third-level structure. Therefore, the file content in the first-level structure is first read to an object (A), and the file content in the object (A) is determined as the file content in the first-level structure corresponding to the field for indicating the loading parameter. The object (A) is a storage medium defined in the controller, and is configured to temporarily store the read file content in the first-level structure.

The object (A) is further searched for the file content in the second-level structure and the file content in the second-level structure is stored in an object (B). The file content in the object (B) is determined as the file content in the second-level structure corresponding to the field for indicating the loading parameter. The object (B) is a storage medium defined in the controller, and is configured to temporarily store the file content in the second-level structure.

Finally, the object (B) is searched for the file content corresponding to the field for indicating the loading parameter, that is, the file content in the second-level structure is searched for the file content corresponding to the field for indicating the loading parameter, and the file content found in the file content in the second-level structure is determined as the file content in the third-level structure. The file content in the third-level structure is determined as the loading parameter.

The file content corresponding to the third-level structure is stored to a structure, and the file content in the third-level structure stored in the structure is determined as the loading parameter.

The loading parameter is read from the application description file by JSPlugins interface and then stored into the structure. Finally, the loading parameter stored in the structure is fed back to the controller, to facilitate subsequent presentation of the loading page with rich display content.

Therefore, referring to FIG. 14, the controller is configured for performing the following steps.

S1401, Read a loading parameter from an application description file.

S1402, Read file content to a character string.

S1403, Determine whether a field for indicating the loading parameter exists. If the field for indicating the loading parameter exists, the flow goes to S1404; otherwise, the flow goes to S1405.

S1404, Parse the character string to value.

S1405, Return to "Null".

S1406, Determine whether it is a first-level structure. If it is the first-level structure, the flow goes to S1407; otherwise, the flow goes to S1408.

S1407, Read the file content to a structure.

S1408, Determine whether it is a second-level structure. If it is the second-level structure, the flow goes to S1410; otherwise, the flow goes to S1409.

S1409, Read the first-level structure to an object (A).

S1410, Read the first-level structure to an object.

S1411, Read the file content in the second-level structure from the object (A) to an object (B).

S1412, Read the file content in the second-level structure from the object.

S1413, Read the file content in the third-level structure from the object (B) to the structure.

S1414, Stored to the structure.

S3. Writing the loading parameter into the URL of the loading page to generate a new URL of the loading page.

After the loading parameter of the loading page in the application, which may be a picture, a video, or other content, is obtained from the application description file, the loading parameter is written into a URL of the loading page to generate a new URL of the loading.

In some embodiments, since the URL of the loading page is a file protocol URL, after the loading parameter is written into the URL of the loading page, a new URL of the loading page is:

packageWindow="file:///usr/local/opt/webengine/resources/statuspage/loading_Page.html?image="+path+appInfo.image+"&backgroundcolor="+appInfo.backgroundcolor+"&statusWindow="+path+appInfo.statusWindow+"&appname="+appInfo.appname.

In some embodiments, the loading parameter obtained from the application description file is:
image="+path+appInfo.image+"&backgroundcolor="+appInfo.backgroundcolor+"&statusWindow="+path+appInfo.statusWindow+"&appname="+appInfo.appname".

The loading parameter can achieve rich content display, where image is file content in the third-level structure, and backgroundcolor is file content in the third-level structure.

S4. Presenting, on a display, the loading page including the display content corresponding to the loading parameter, based on the new URL of the loading page.

The loading page may be displayed on the display by loading the new URL of the loading page. In this way, the display content, such as pictures or videos, corresponding to the loading parameter is displayed in the loading page. In view of the above, when a user launches an application, while loading the loading page, it is not that merely a monotonous pattern of a loading circle is displayed, instead the splash information in the application description file may be loaded and displayed, to achieve a configurable splash screen and improve user experience.

In some embodiments, when a user launches an application, during a process of waiting for the application to be loaded, a loading page displaying rich content is presented on the display. Meanwhile, an application display page of the application is loaded in the background, and the loading page will shield the presentation of the application display page, therefore a blank interface in the loading process of the application display page cannot be seen by the user, otherwise the blank interface affects user experience.

Therefore, when implementing a method for loading the loading page, the controller is further configured for: while the loading page is being presented on the display, loading an application display page of the application in the background; and when display duration of the loading page reaches a preset duration, presenting the application display page of the application on the display, and cancelling presentation of the loading page.

When the display apparatus presents the loading page on the display based on the new URL of the loading page, the application display page of the application may be loaded in the background at the same time. The display duration of the loading page is limited, to prevent the user from waiting for too long. Therefore, a preset duration may be set. In some embodiments, the preset duration may be set to be 3 seconds.

When the display duration of the loading page reaches the preset duration, the presentation of the loading page is canceled, and the application display page of the application is presented on the display, implementing the loading of the application.

Since the display duration of the loading page is relatively short, quick loading is required when the controller needs to load the application display page of the application in the background.

In some embodiments, in order to improve a launching speed of an application and application loading performance while launching an application, a target protocol URL of the application may be packaged into a file protocol URL. In other words, while launching the application, front-end code originally running in the cloud may be safely loaded on a terminal, and is invoked based on the file protocol in the form of a unified scheme. In this way, not only the loading performance during web application launching is guaranteed, but also the loading experience is also improved. Meanwhile, based on the unified Scheme mechanism, the web application is launched by means of invoking a unified interface, without exposing technical details, thereby shielding correlations between systems and improving security.

Figure 15:
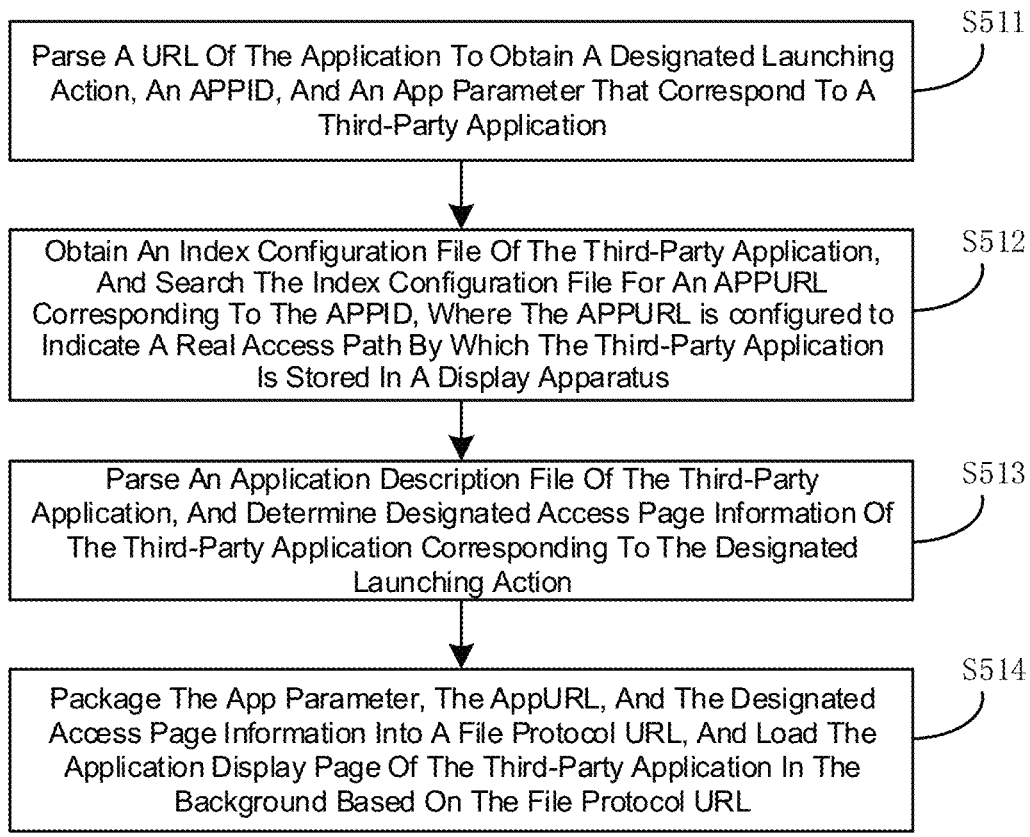
FIG. 15 is a flowchart of a method for loading an application display page according to some embodiments.

FIG. 15 is a flowchart of a method for loading an application display page according to some embodiments. Therefore, referring to FIG. 15, the controller is configured for loading the application display page of the application in the background by the following.

S511. Parsing a URL of an application to obtain a predefined launching action, an APPID, and an APP parameter that correspond to the application.

S512. Obtaining an index configuration file of the application, and searching the index configuration file for an APPURL corresponding to the APPID, where the APPURL is configured to indicate a real access path by which the application is stored in the display apparatus.

S513. Parsing an application description file of the application, and determining designated access page information of the application corresponding to the designated launching action.

S514. Packaging the APP parameter, the APPURL, and the designated access page information into a file protocol URL, and loading the application display page of the application in the background based on the file protocol URL.

In order to improve loading efficiency of the application, the URL of the application using the target protocol is replaced with a URL based on the file protocol. Therefore, the URL of the application is parsed to obtain a designated launching action (Action), an APPID, and an APP parameter that correspond to a designated web application.

In some embodiments, the controller is configured to select a custom scheme, that is, customize the target protocol as a file protocol, where details are hidden, and path management and dependency are remained within the module, and a UI is independent from a cloud platform.

The custom scheme includes at least the following contents 1 to 6.

"1. Scheme field: referring to a custom protocol, default to a certain protocol, where webengine may recognize this Scheme for processing.

2. Host field: referring to a type of an application, default to webapps, i.e., a web application.

3. Port field: used for special management, default to void, for example, if the application is launched through a particular port in a debug mode, log may be opened/experimental characteristics may be enabled.

4. Action field: including (1) Launch: application launching; (2) Deeplink: a deep link; and the like.

5. ID field: an APPID.

6. Parm field: an APP parameter."

The real access path (APPURL) of the application is necessary for customizing file protocol URL, and the APPURL is stored in the index configuration file of the application. Therefore, the index configuration file of the application needs to be obtained first. The index configuration file is an application configuration file of a Pkgapps type, which is stored in database file /APPS/pkgapps/mapindex.txt in a unified way, and is controlled and read by the browser in a unified way. The index configuration file is mainly for starting mapping between a link and a real URL, and to implement a Deeplinking function.

A configuration index table mapindex is obtained from the code package of the application, and configuration index information is stored in the configuration index table, which includes, but is not limited to the following contents:

"APPID field: an internal id, aligned with the cloud, and not stored in a software package;

APPURL field: an internal URL, a real file address;

Updatestatus field: '0' indicating normal use; and '1' indicating an updating process;

Launchcount field: indicating how many times has been launched;

Createtime field: a creation date;

Updatetime field: an update date;

Versionname field: a software version."

The foregoing configuration index information is stored in a database file/APPS/pkgapps/mapindex.txt in the following format: APPID|APPURL|Updatestatus|Launchcount|Createtime|Updatetime|Versionname, to serve as content of the configuration index table, being a configuration file of a Pkgapps type.

When the designated application is being launched, it is determined whether the configuration index table is void. If the configuration index table is not void, the configuration index information of the configuration index table, that is, the file /APPS/pkgapps/mapindex.txt, is obtained, where information in each line is separated by a symbol '|', and information APPID, APPURL, Updatestatus, Launchcount, Createtime, Updatetime, and Versionname are sequentially recognized and are respectively stored in structures, thus obtaining a plurality of structures.

One of the structures is used as a key, and the others are used as values of the key, to establish a mapping relationship. In some embodiments, the APPID of the designated application is used as a key, and the structures of the other information are used as values to form a mapping relationship, which is stored in the configuration index table. The configuration index table storing the key-value mapping relationship is used as an index configuration file of the designated application, to facilitate following invoking.

When the APPURL of the application needs to be obtained, the configuration index information in the index configuration file is traversed. Based on the APPID of the designated application and the key-value mapping relationship, the APPID of the designated application is used as a key, and the key-value mapping relationship is traversed. It may be found that the values are respectively the APPURL, Updatestatus, Launchcount, Createtime, Updatetime, Versionname, or another structure. Therefore, the APPURL corresponding to the APPID, as the real file address of the designated application, serves as a data source for a URL that is converted into a file protocol later.

After the APPURL of the application is obtained, the designated access page information of the application needs to be determined according to the designated launching action of the application.

The code package of the designated application to be launched is obtained, and the application description file (the manifest.json file) is obtained from the code package. The manifest.json file is parsed to obtain a character string including a plurality of fields. By comparing the character string with the target protocol URL, the designated launching action of the designated web application may be determined.

The target protocol URL is the above URL of the application. Through parsing, the designated launching action (Action) is extracted from the URL of the application, and a designated access action includes launch or deeplink. Page information corresponding to the designated launching action is obtained from the application description file, as the designated access page information, so as to serve as a data source of a real URL of the designated web application.

For example, if the target protocol URL is://apps/launch/12345, the designated launching action for launching "application12345" is launch. If the target protocol URL is://apps/deeplink/12345, the designated launching action for launching "application 12345" is deeplink.

Data sources based on which the target protocol URL of the designated application is re-packaged into a file protocol URL respectively are the APP parameter, APPURL, and designated access page information that are obtained by processing the URL of the application, the index configuration file, and the application description file, as stated above. The foregoing information is mapped into a real file protocol URL to launch the designated application so as to present the application display page on the display.

Because the designated access page information may be page information corresponding to launch or page information corresponding to deeplink, there may be two different forms when the information is mapped into the file protocol URL.

In some embodiments, when the designated launching action is launch, the controller parses the application description file, and compares the obtained configuration information with the designated launching action (Action) determined in the target protocol URL (URL of the application). If the Action is launch, the page information corresponding to launch in the configuration information is read as the designated access page information of the designated application.

Specifically, when the Action is launch, the designated access page information is index field information. In other words, the index field information in the page information corresponding to launch is read from the application description file (manifest.json file), that is, page→index field. The APP parameter, the APP URL, and the index field information (page→index field) are packaged into the file protocol URL.

In some embodiments, when the designated launching action is deeplink, the controller parses the application description file, and compares the obtained configuration information with the designated launching action (Action) determined in the target protocol URL (URL of the application). If the Action is deeplink, the page information corresponding to deeplink in the configuration information is read as the designated access page information of the designated web application.

Specifically, when the Action is deeplink, the designated access page information is deeplink field information. In other words, the deeplink field information in the page information corresponding to deeplink is read from the application description file (manifest.json file), that is, page→deeplink field. The APP parameter, the APP URL, and the deeplink field information (page→deeplink field) are packaged into the file protocol URL.

Launching of the designated web application based on the file protocol URL obtained through the foregoing two packaging manners may improve a loading speed of the application. Meanwhile, according to a unified Scheme mechanism, a URL is customized to obtain the file protocol URL, so that the designated application is launched in a format of a unified interface. In this way, technical details may be hidden, correlations between systems may be shielded, and security may be improved.

In view of the above, the display apparatus provided in the embodiments of the present invention is able to invoke a code package of an application to perform unified management to the application. Moreover, while launching the application the loading parameter is obtained from the code package, and is written into the URL of the loading page, and the loading page displaying the display content corresponding to the loading parameter is presented based on a new URL of the loading page. In this way, the display content is richer and the user experience is improved. Meanwhile, the URL of the application of the application may be converted into the file protocol URL based on the configuration information in the code package while the application display page is loaded in the background. In this way, the loading performance of the application and the management efficiency are improved.

FIG. 7 is a flowchart of a method for loading a loading page of an application according to some embodiments. Referring to FIG. 7, an embodiment of the present invention provides a method for loading a loading page of an application, which is implemented by the controller of the display apparatus provided in the foregoing embodiments. The method includes: in response to an instruction for launching an application, obtaining a URL of the application, a code package of the application, and a URL of a loading page of the application; in response to the URL of the application being a target protocol URL, reading, from the code package, a loading parameter for enabling the loading page of the application to present display content; writing the loading parameter into the URL of the loading page to generate a new URL of the loading page; and presenting, on the display, the loading page including the display content corresponding to the loading parameter, based on the new URL of the loading page.

It may be learned from the foregoing technical solutions that the embodiments of the present application provide a method for loading a loading page of an application and a display apparatus. While launching the application, the URL of the application, the code package, and the URL of the loading page are obtained; when the URL of the application is a target protocol URL, the loading parameter is read from the code package; the loading parameter is written into the URL of the loading page; and based on a new URL of the loading page, the loading page including the display content corresponding to the loading parameter is presented on the display. In view of the above, according to the method and the display apparatus provided in the embodiments of the present invention, while waiting for the application data to be loaded, richer display content provided from the code package is presented on the loading page, so that the loading performance of the application is improved and the user experience is improved.

Figure 16:
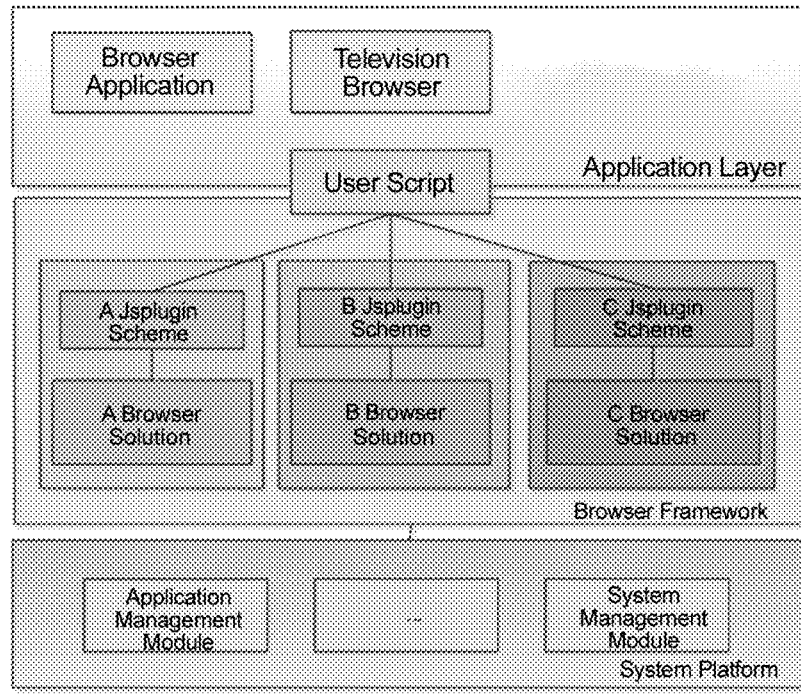
FIG. 16 is a schematic diagram illustrating a browser from a solution provider.

As shown in FIG. 16, during a process in which a browser application is interconnected with a system platform, a browser solution from a solution provider is used. The browser application is developed based on html and js programming languages. When the browser application needs to use a function of the system platform, an interface of the system platform needs to be invoked, to invoke a television function through a solution provided by the solution provider.

Figure 17:
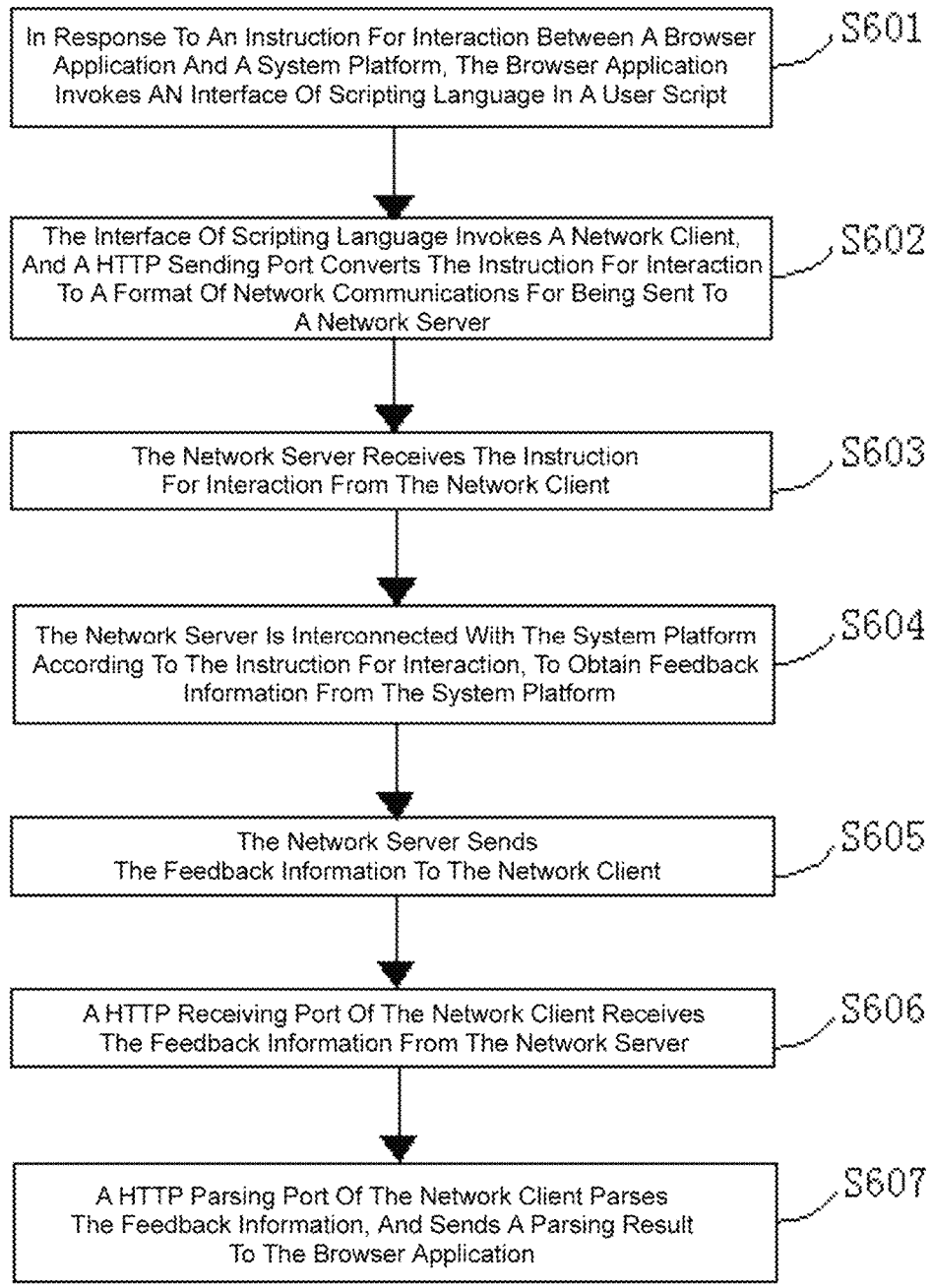
FIG. 17 is a flowchart of a method for interaction between a browser application and a system platform.

FIG. 17 illustrates a flowchart of a method for interaction between a browser application and a system platform.

With reference to FIG. 17, the method includes the following steps.

S601. In response to an instruction for interaction between a browser application and the system platform, the browser application invokes an interface of the scripting language in a user script.

A browser refers to a browser solution provided by a solution provider. The browser application refers to a browser-based application of the system platform, and most of the browser-based applications are provided by the browser provider. The user script is a customized extension script and runs locally to implement particular functions.

In some embodiments, the instruction for interaction between the browser application and the system platform may be an instruction for obtaining a system parameter or may be an operation instruction for a system function. The instruction for interaction between the browser application and the system platform may be triggered by a user through operating a control device, for example, volume adjustment; or may be automatically triggered by the browser application, for example, obtaining subtitle language of a video.

In some embodiments, the instruction for interaction may be an HTTP (hypertext transfer protocol) request, such as GET localhostport/URI/variable, POST localhostport/URI/variable, or DELETE localhostport/URI/variable.

In some embodiments, a network client itself is also a user script. During a process of loading the browser application, the network client may be loaded as a user script.

S602. The interface of scripting language invokes a network client, and a HTTP sending port of the network client converts the instruction for interaction to a format of network communications for being sent to a network server.

Fixed ports of the network client include the HTTP sending port, a HTTP receiving port, and a HTTP parsing port.

S603. The network server receives the instruction for interaction from the network client.

A network service provided by the network server specifically refers to receiving/feeding back/processing a request and an instruction from the network client.

S604. The network server is interconnected with the system platform according to the instruction for interaction, to obtain feedback information from the system platform.

In some embodiments, the instruction for interaction is called an interaction instruction. The interaction instruction is to obtain a specific platform parameter, where an execution result may be returned in a JSON format or an XML format, and the returned information is a specific platform parameter.

In some embodiments, the interaction instruction is to adjust volume, set a parameter, or the like. The network server may feed an operation result back to the network client.

In some embodiments, when the obtained platform parameter is constant, the feedback information from the system platform may be obtained from a file data source, that is, data obtained from a file in the television. When the obtained platform parameter is variable, the feedback information from the system platform may be obtained from a system data source, that is, data obtained from a system of the television.

S605. The network server sends the feedback information to the network client.

S606. A HTTP receiving port of the network client receives the feedback information from the network server.

S607. A HTTP parsing port of the network client parses the feedback information, and sends a parsing result to the browser application.

In some embodiments, the HTTP parsing port may send the parsing result directly to the browser application, or may send the parsing result to the user script and the parsing result is sent to the browser application through the user script.

Figure 18:
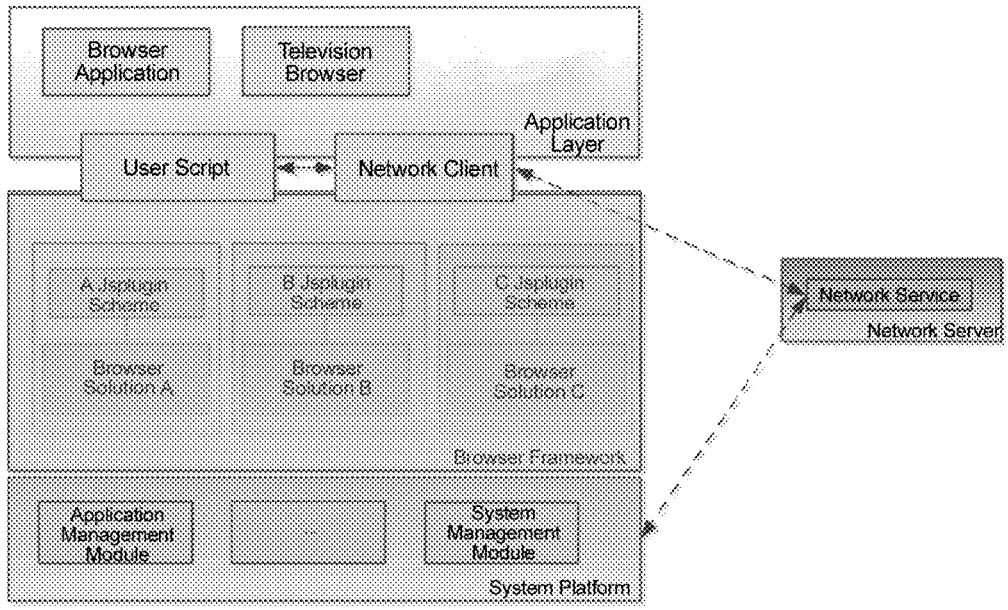
FIG. 18 is a schematic diagram according to a browser solution of the present application.
Figure 19:
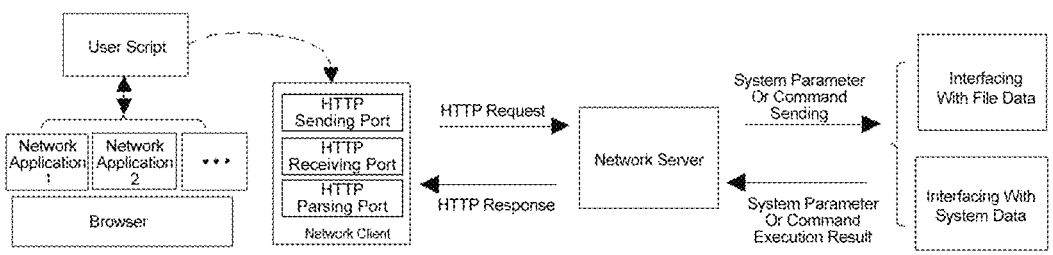
FIG. 19 is a schematic communication diagram illustrating a method for interaction between a browser application and a system platform.

As shown in FIG. 18 and FIG. 19, in order to resolve inconvenience caused by an extension interface solution of the browser provider, by means of intra-device communications, the browser application is enabled to interact with the system platform through network services without the browser. In the present application, the browser application may communicate with the system platform merely by placing the user script file into a directory according to which the user script is loaded.

Figure 20:
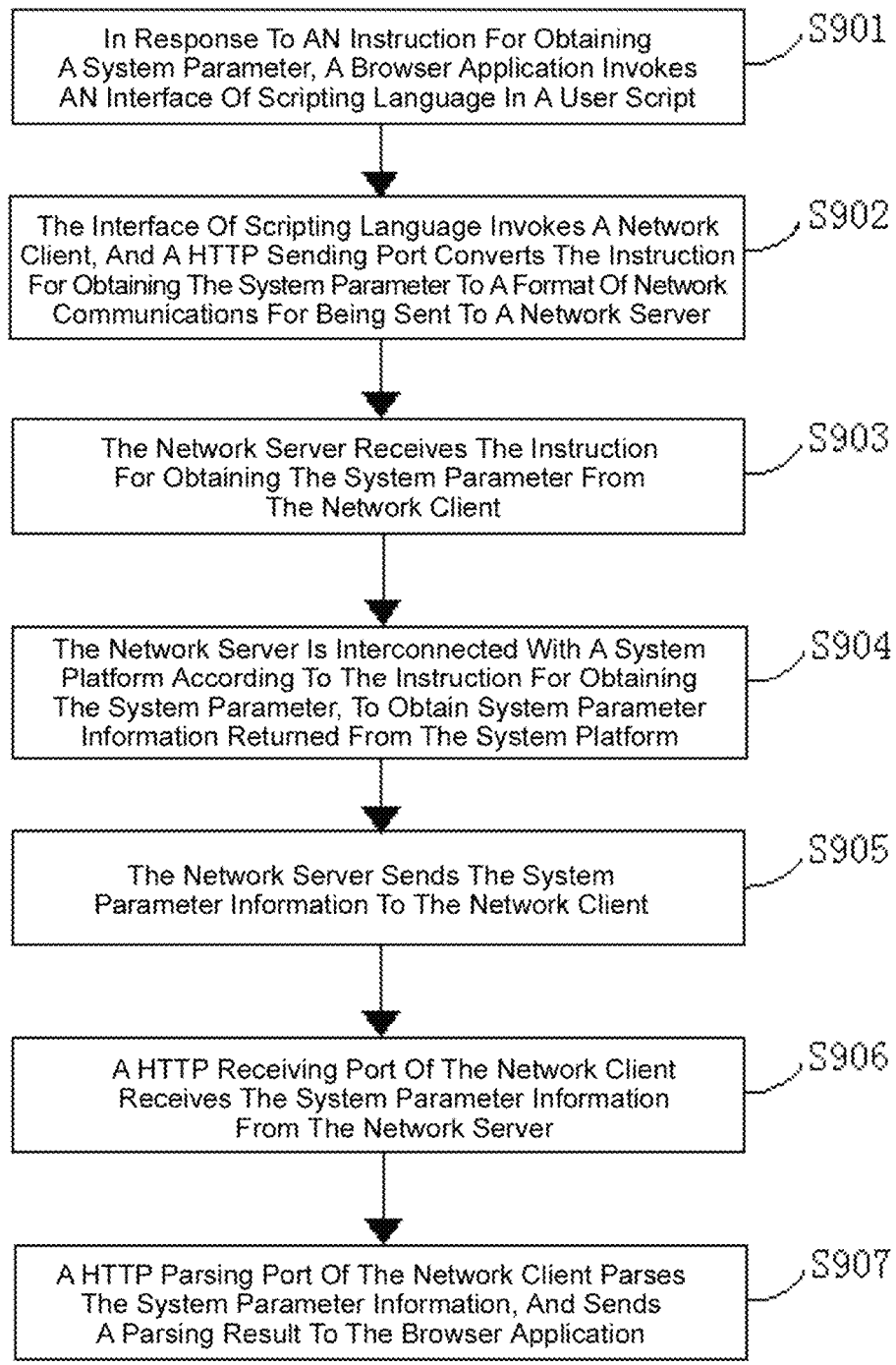
FIG. 20 is a flowchart of a method for obtaining a system parameter.

FIG. 20 illustrates a flowchart of a method for obtaining a system parameter.

With reference to FIG. 20, the method includes the following steps.

S901. In response to an instruction for obtaining a system parameter, a browser application invokes an interface of the scripting language in a user script.

S902. The interface of the scripting language invokes a network client, and a HTTP sending port of the network client converts the instruction for obtaining a system parameter into a format of network communications for being sent to a network server.

S903. The network server receives the instruction for obtaining the system parameter from the network client.

S904. The network server is interconnected with a system platform according to the instruction for obtaining the system parameter, to obtain system parameter information returned from the system platform.

S905. The network server sends the system parameter information to the network client.

S906. A HTTP receiving port of the network client receives the system parameter information from the network server.

S907. A HTTP parsing port of the network client parses the system parameter information, and sends a parsing result to the browser application.

For example, the browser application needs to display subtitles of a video during a playback process. Because there are a lot of languages for subtitles, at this time, the browser application needs to confirm a display language of the system platform, to select a language for the subtitle. According to a prior scheme, the browser application first needs to interact with the browser SDK (Software Development Kit) provided by the solution provider, the browser SDK interacts with JS Plugin, and then JS Plugin interacts with the system platform, to complete the overall process.

Figure 21:
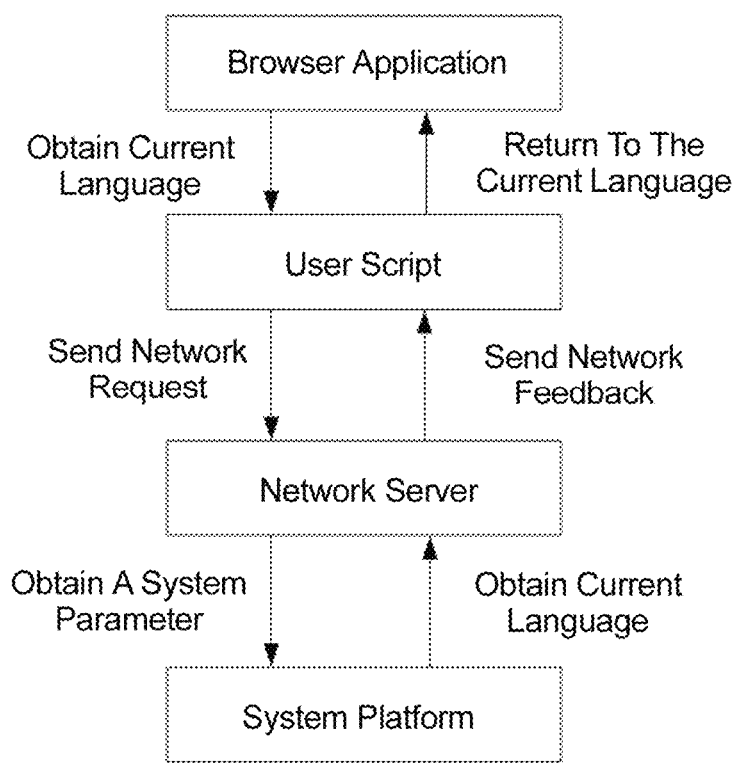
FIG. 21 illustrates a flowchart of obtaining a current language.

As shown in FIG. 21, the embodiment of the present application is that: an interface of the scripting language in the user script is invoked when the browser application needs to confirm the display language of the system platform, and the network client is invoked through the interface; the network client sends a network request for obtaining a current language to the network server; and the network server is interconnected with the system platform to send the current language returned from the system platform to the network client, and then the current language is sent to the browser application by the network client. The network client is also a user script, and the user script in FIG. 21 also includes a network client. The scheme in the present application removes the binding with the browser SDK, and skips the JS Plugin. In this way, by means of network communications, the browser application is enabled to interact with the system platform through the network server, thus avoiding a lot of interaction work.

Figure 22:
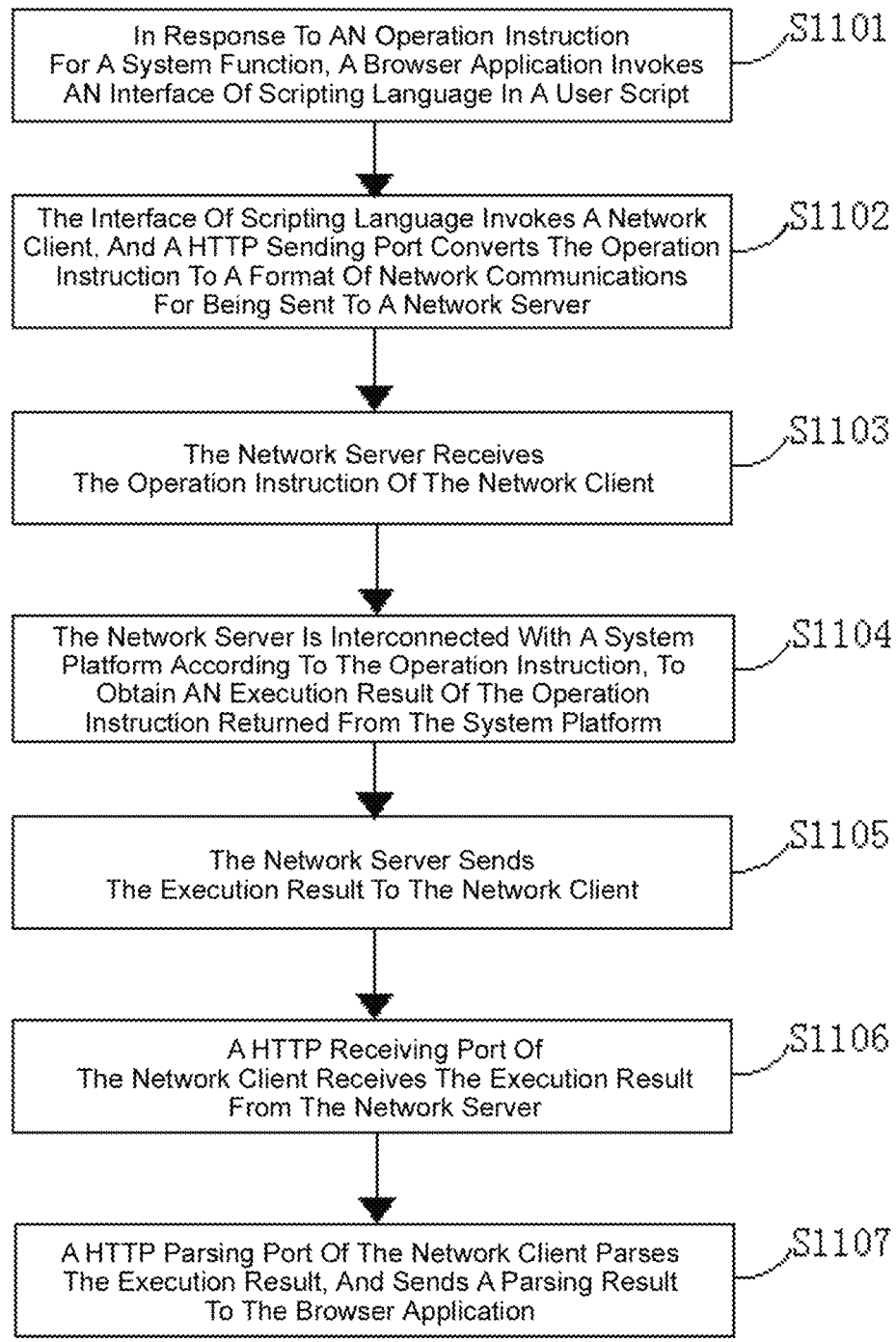
FIG. 22 illustrates a flowchart of a method for performing system function operations.

FIG. 22 shows a flowchart of a method for performing system function operations.

With reference to FIG. 22, the method includes the following steps.

S1101. In response to an operation instruction for a system function, a browser application invokes an interface of scripting language in a user script.

S1102. The interface of the scripting language invokes a network client, and a HTTP sending port of the network client converts the operation instruction into a format of network communications for being sent to a network server.

S1103. The network server receives the operation instruction from the network client.

S1104. The network server is interconnected with a system platform according to the operation instruction, to obtain an execution result of the operation instruction returned from the system platform.

S1105. The network server sends the execution result to the network client.

S1106. A HTTP receiving port of the network client receives the execution result from the network server.

S1107. A HTTP parsing port of the network client parses the execution result, and sends a parsing result to the browser application.

Figure 23:
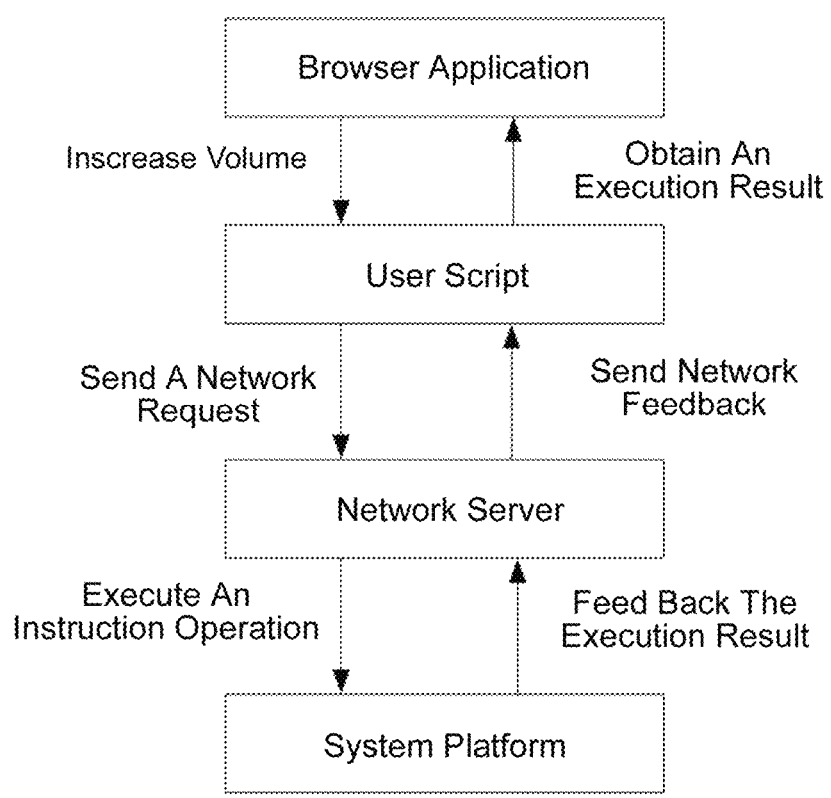
FIG. 23 illustrates a flowchart of increasing volume.

For example, during playback of the browser application, a user wants to increase volume. As shown in FIG. 23, the embodiment of the present application is that: the browser application invokes an interface of the scripting language in the user script after a user sends an instruction for increasing volume, and invokes the network client through the interface; the network client sends a network request for increasing volume to the network server; the network server is interconnected with the system platform, to execute an instruction operation; the system platform feeds back an execution result of the instruction to the network server; and the network server sends the execution result to the network client, and then the execution result is sent to the browser application by the network client.

In some embodiments, if error information is generated in the browser application, the error information may be inserted into directly an application page; or an error information report may be printed on a log of the system platform through communications between the network client, the network server, and the system platform. Further, problems may be located and debugged according to print time on the log and a function invoking order, to facilitate problem locating and process sorting.

In the foregoing embodiments, the browser application interacts with the system platform through network services without an extension interface solution of a browser. A request or a specific instruction is sent to the network server through the network client. The network server is interconnected with a platform to process the request and distribute the instruction, so as to avoid dependence on a browser solution. In this way, possible occurrences of security issues are avoided. The present application no longer depends on the extension interface solution from the browser provider, so that the browser application can interact with the system platform efficiently and safely.

With development of HTML5 (Hypertext Markup Language5) and related web technologies, at present, web Apps (web applications) developed based on the HTML5 technology are increasingly widely accepted and favored by developers. Compared with a conventional native App (native application), the web App has relatively low development costs, and is simple for upgrading, easy for maintenance, and does not require installation, consumes no user storage space, etc.. The web App is essentially a web site customized for a display apparatus such as a mobile phone or a television.

However, disadvantages of the web App are also obvious. Because the web App can only run in the browser of the display apparatus and is independent from the system of the display apparatus, usually some interfaces are open for this type of applications to implement some customized functions, such as system parameter obtaining or setting, database operating, and file reading and writing. Implementation of these functions requires the web App to invoke the interface in the display apparatus through the browser. At present, in the industry, usually the application is enabled to access a system resource by invoking an interface in JavaScript extension. However, the JavaScript script may be automatically embedded in a page of the application while running. All interfaces and implementations thereof are exposed to the outside, and an application developer can see definitions of all interfaces and implementations thereof. As a result, native resources of the display apparatus may be misused.

In order to prevent application developers from misusing the native resources of the display apparatus, and also to ensure information security for the user of the display apparatus, interface invoking by the web App is usually restricted. In addition to the conventional approach of managing a native interface of the display apparatus by using an application name, in the industry, a dedicated message channel is established with a server usually by means of using a HTTP (HTTP) request in JavaScript. The server confirms identity of the application by obtaining information from a HTTP header, and then authenticates the identity, to allow or deny a subsequent request of the application.

However, the native interface of the display apparatus has relatively high management and maintenance costs and relatively poor scalability. Every time a new application is added or a new interface is added, the native interface needs to be re-adapted. Although the foregoing method of using a HTTP request can resolve the problem that the native interface of the display apparatus has poor scalability, the HTTP request can be forged. If the web application successfully forges a HTTP request so that authorization of the application is obtained and a message channel with the server is established, the web application may illegally invoke the native interface of the display apparatus, which greatly threatens user information security and resource security of the display apparatus.

On the basis of the foregoing content, the embodiments of the present application provide an interface invoking method for a web application, a display apparatus, and a server. An authentication process of the web application may be separated from an interface invoking process. The authentication process is performed prior to a launching process of the web application, and an interface file generated by the server in the authentication process is difficult to be modified by the web application in the browser of the display apparatus. In this way, the interface file may be prevented from being forged, and a case in which resources of the display apparatus are misused because the interface is randomly invoked by the web application may also be avoided. The user information security and the resource security of the display apparatus are ensured at the same time.

The methods provided in the embodiments of the present application include two methods applied to the display apparatus 200 and the server 400, respectively, so as to achieve the communications between the display apparatus 200 and the server 400.

Figure 24:
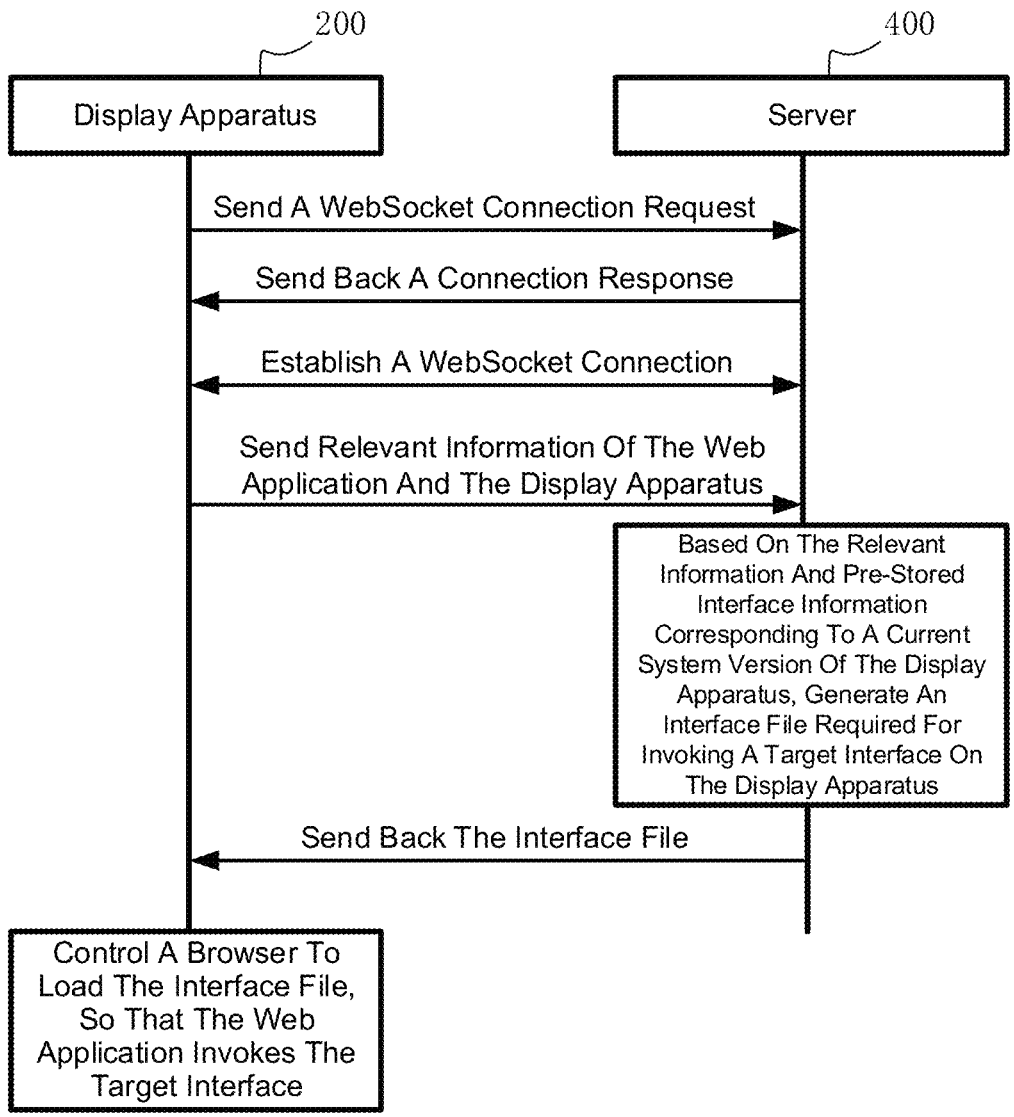
FIG. 24 is a schematic diagram illustrating an interaction process between a display apparatus 200 and a server 400 according to an embodiment of the present application.

FIG. 24 is a schematic diagram illustrating an interaction process between a display apparatus 200 and a server 400 according to an embodiment of the present application. As shown in FIG. 24, after the display apparatus 200 and the server 400 respectively perform the interface invoking method for a web application, an interaction process for completing interface invoking may be performed. Finally, an interface file is generated by the server 400, and is loaded in the display apparatus 200. The interface file would not be modified by the web application, and further the interface file may be prevented from being forged. A situation where resources of the display apparatus 200 are misused due to randomly invoking of the interface by the web application may be avoided. Moreover, both of user information security and resource security of the display apparatus 200 are ensured.

The display apparatus 200 provided in the embodiments of the present application may include a controller. The controller is mainly configured to: send relevant information of the web application and the display apparatus 200 to the server 400 in response to an instruction for launching a web application sent from a browser; receive an interface file, sent back from the server 400, generated based on the relevant information of the web application and the display apparatus 200; and control the browser to load the interface file, so that the web application invokes a target interface. The interface file is used to determine use permission and a parameter of the target interface that needs to be invoked by the web application.

The display apparatus 200 in the embodiments of the present application may be a device that can be installed with a browser and can run a web application through the browser, such as, a smart phone, a smart television, or a computer.

If a user wants to open a web application through the browser on the display apparatus 200, the browser needs to notify the display apparatus 200 that the web application needs to be launched. In this case, an instruction for launching the web application needs to be sent to the display apparatus 200. The launching instruction may usually include information such as a name of the web application and the target interface that needs to be called, so that the display apparatus 200 can learn a situation of the web application. After receiving the launching instruction, the display apparatus 200 needs to send, relevant information and information related to the web application that needs to be launched, to the server 400, so that the server 400 generates a corresponding interface file based on these information.

The relevant information of the display apparatus 200 includes a system version of the display apparatus 200 or model of the display apparatus 200. Taking the smart television as an example, in each updating and iteration, a version of a system carried in the product is different, or the model of the product is different. Functions or use permission of an interface corresponding to each system version may also be changed or updated. Therefore, the display apparatus 200 needs to send, itself system version, the model or other information that can clarify itself interface content, to the server 400, so that the server 400 can accurately find an interface corresponding to a current system version of the display apparatus 200.

The relevant information of the web application includes interface requirements information of the web application, that is, which target interface or target interfaces need to be invoked by the web application. While sending itself relevant information, the display apparatus 200 also sends the interface requirements information of the web application, so that the server 400 can accurately determine, from interfaces corresponding to target system versions of the display apparatus 200, the target interface that needs to be invoked by the web application.

In view of the above, when the relevant information of the display apparatus 200 includes the system version of the display apparatus 200 or the model of the display apparatus 200, and the relevant information of the web application includes the interface requirements information of the web application, in some embodiments, the controller in the display apparatus 200 is further configured to: obtain system version information about the display apparatus 200 and interface requirements information about a web application currently to be launched; and send the system version information and the interface requirements information to the server 400. The interface requirements information is used to indicate information about the target interface that needs to be invoked by the web application.

Usually, after receiving the relevant information of the web application and the display apparatus 200, the server 400 may analyze, based on the relevant information, the current system version of the display apparatus 200 and the target interface that needs to be invoked by the web application; further generate an interface file corresponding to the target interface by using Python script; and send the interface file to the display apparatus 200.

After determining the target interface, the server 400 also determines some information about types of the target interface. A first type is a type of interfaces based on basic settings of the display apparatus 200. By invoking this type of interfaces, basic setting parameters of the display apparatus 200, such as volume and an image mode of the current display apparatus 200 and a parameter about whether the display apparatus 200 supports a 4K image, can be obtained; and the basic parameters may also be set, for example, the volume of the display apparatus 200 may be set. A second type is a type of interfaces based on advanced settings of the display apparatus 200. By invoking this type of interfaces, some functions which require permission may be implemented, such as reading/writing a file in the display apparatus 200 and reading content written into a database. Alternatively, by invoking this type of interfaces, some advanced functions may be set, such as setting a password of the display apparatus 200. A third type is a type of customized interfaces, which are provided only for some particular web applications.

The server 400 generates respective corresponding interface files for different target interfaces based on types of the foregoing target interface and some functions or permission that can be implemented thereby. The use permission and some invoking parameters of the target interface are defined in the interface file.

Usually, after the interface file is loaded by the browser, the web application may freely invoke the target interface corresponding to the interface file, so as to perform some operations to the display apparatus 200, such as setting the volume of the display apparatus 200 and setting the password of the display apparatus 200.

In the foregoing embodiments, content before the browser loads the interface file may be regarded as a process of authenticating the web application. An interface file generated in the authentication process cannot be modified by the web application. In this way, the interface file may be prevented from being forged, and a situation where the resources of the display apparatus 200 are misused due to randomly invoking of the interface by the web application may be avoided. Moreover, both of the user information security and the resource security of the display apparatus 200 are ensured.

Figure 25:
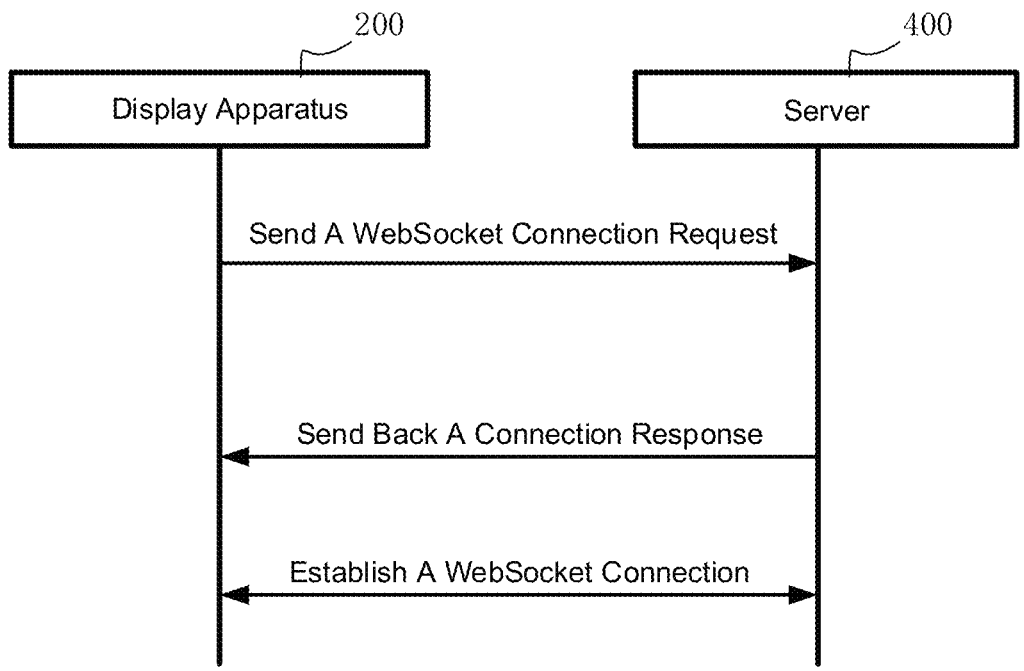
FIG. 25 is a schematic diagram illustrating interaction for establishing a WebSocket connection between a display apparatus 200 and a server 400 according to an embodiment of the present application.

In order to simplify a communication process between the display apparatus 200 and the server 400 and quickly realize the communications between the two parties, in some embodiments, a WebSocket connection may further be established between the display apparatus 200 and the server 400. FIG. 25 is a schematic diagram illustrating interaction for establishing a WebSocket connection between a display apparatus 200 and a server 400 according to an embodiment of the present application.

As shown in FIG. 25, the controller in the display apparatus 200 is further configured to: in response to an instruction for launching a web application sent from the browser, send a WebSocket connection request to the server 400; establish a WebSocket connection with the server 400 upon receiving a connection response sent back from the server 400; and initiatively send relevant information of the web application and the display apparatus 200 to the server 400.

WebSocket is a protocol for full-duplex communications on a single TCP connection. WebSocket makes data exchange between the display apparatus 200 and the server 400 easier, allowing the server 400 to initiatively push data to the display apparatus 200. In the embodiments of the present application, based on the WebSocket connection, the browser of the display apparatus 200 and the server 400 need to complete only one handshake so as to directly establish a persistent connection therebetween, and perform two-way data transmission.

After receiving the connection request, the server 400 may send the connection response to the display apparatus 200, indicating that a WebSocket connection may be established with the display apparatus 200.

After the WebSocket connection is established, data or information transmission between the display apparatus 200 and the server 400 is based on WebSocket, so that a communication process between the display apparatus 200 and the server 400 may be easier and communication efficiency may be improved.

In some embodiments, in order to help the server 400 to generate respective corresponding interface files for different target interfaces, for configuration content of a system version of the display apparatus 200, the controller in the display apparatus 200 may further store interface information corresponding to the current system version in the server 400 before the foregoing method or the authentication process is started.

The interface information is used to indicate setting content and permission content of the display apparatus 200 corresponding to all interfaces in the current system version, such as some type information of the foregoing target interface. Usually, whenever the system version of the display apparatus 200 is updated, a new directory may be created in the server 400 to store the interface information corresponding to the system version.

In some embodiments, after receiving the interface file, the display apparatus 200 may further store the interface file in a particular location, so that the browser can automatically load the interface file. The controller in the display apparatus 200 is further configured to: store the interface file in a preset browser directory; and control the browser to automatically load the interface file in the browser directory, so that the web application invokes the target interface.

A read/write permission of the browser directory is open merely to an interface invoking operation of the current web application, or is open only to the current authentication process, and cannot be modified by another operation or another process. In this way, security of the interface file is also further ensured.

The server 400 provided in the embodiments of the present application may include a controller. The controller is mainly configured to: receive relevant information of the web application and the display apparatus 200 sent from the display apparatus 200; based on the relevant information and the pre-stored interface information corresponding to the current system version of the display apparatus 200, generate an interface file required for invoking the target interface on the display apparatus 200, where the interface file is used to determine the use permission and a parameter of the target interface; and send the interface file back to the display apparatus 200, so that the browser on the display apparatus 200 loads the interface file and the web application invokes the target interface.

The relevant information of the display apparatus 200 includes a system version of the display apparatus 200 or model of the display apparatus 200. The relevant information of the web application includes interface requirements information of the web application, that is, which target interface or target interfaces need to be invoked by the web application.

After receiving the relevant information of the web application and the display apparatus 200, the server 400 may analyze, based on the relevant information, the current system version of the display apparatus 200 and the target interface that needs to be invoked by the web application;

and further generates the interface file corresponding to the target interface by using the Python script.

After determining the target interface, the server 400 also determines some information about types of the target interface. A first type is a type of interfaces based on basic settings of the display apparatus 200. By invoking this type of interfaces, basic setting parameters of the display apparatus 200, such as volume and an image mode of the current display apparatus 200 and a parameter about whether the display apparatus 200 supports a 4K image, can be obtained; and the basic parameters may also be set, for example, the volume of the display apparatus 200 may be set. This type of interfaces may be invoked by all web applications. A second type is a type of interfaces based on advanced settings of the display apparatus 200. By invoking this type of interfaces, some functions which require use permission may be implemented, such as reading/writing a file in the display apparatus 200 and reading content written into a database. Alternatively, by invoking this type of interfaces, some advanced functions may be set, such as setting a password of the display apparatus 200. This type of interfaces can be merely open to web applications that support the foregoing advanced functions or advanced settings. A third type is a type of customized interfaces, which are provided only for some particular web applications.

The server 400 generates respective corresponding interface files for different target interfaces based on types of the foregoing target interface and some functions or permission that can be implemented thereby. The use permission and some invoking parameters of the target interface are defined in the interface file.

After the interface file is loaded by the browser, the web application may freely invoke the target interface corresponding to the interface file, to perform some operations.

Similarly, in order to simplify a communication process between the display apparatus 200 and the server 400 and quickly realize the communications between the two parties, in some embodiments, a WebSocket connection may be established between the display apparatus 200 and the server 400.

As shown in FIG. 25, the controller in the server 400 is further configured to: receive a WebSocket connection request sent from the display apparatus 200; and send a connection response back to the display apparatus 200, to establish a WebSocket connection with the display apparatus 200.

WebSocket is a protocol for full-duplex communications on a single TCP connection. WebSocket makes data exchange between the display apparatus 200 and the server 400 easier, allowing the server 400 to initiatively push data to the display apparatus 200. In the embodiment of the present application, based on the WebSocket connection, the browser of the display apparatus 200 and the server 400 need to complete only one handshake so as to directly establish a persistent connection therebetween, and perform two-way data transmission.

After receiving the connection request, the server 400 may send the connection response to the display apparatus 200, indicating that a WebSocket connection may be established with the display apparatus 200.

In some embodiments, when the server 400 generates an interface file, the controller is further configured to: based on the relevant information, analyze a system version of the display apparatus 200 and the target interface that needs to be invoked by the web application currently to be launched; find interface information of the target interface based on the system version and the target interface; and generate the interface file corresponding to the target interface based on the interface information.

The interface information herein refers to the foregoing information about interface types and the like. Each target interface has corresponding set content and use permission of the display apparatus 200. For example, an interface A can be invoked by all web applications, an interface B can be invoked only by a web application that support setting of a child-lock password, and an interface C can be invoked only by a web application a.

The server 400 can determine the use permission of each target interface based on the foregoing interface information, and then generate the interface file corresponding to each target interface by using a programming language in combination with invoking parameters of different interfaces.

After the interface file is sent to the display apparatus 200 from the server 400, the browser of the display apparatus 200 loads the interface file, that is, executes a program of the interface file, to enable the web application to freely invoke the target interface corresponding to the interface file, so as to perform some operations to the display apparatus 200, such as setting volume of the display apparatus 200 and setting the password of the display apparatus 200.

The display apparatus 200 and the server 400 in the foregoing embodiments may perform dual-port communications, so as to perform interface invoking for the web application on the display apparatus 200. The interface file generated during the interface invoking process cannot be modified by the web application. In this case, the interface file may be prevented from being forged, and a situation where the resources of the display apparatus 200 are misused due to randomly invoking of the interface by the web application may be avoided. Moreover, both of the user information security and the resource security of the display apparatus 200 are ensured.

In addition, a process of authenticating the web application is placed within a process of launching the web application. This authentication needs to be performed only once, thus reducing resource consumption of the display apparatus 200 and the server 400, thereby improving performance. The entire authentication process is performed between the display apparatus 200 and the server 400, without affecting normal launching of the web application. All of accessible interfaces after the web application is successfully launched are legal, and a situation, such a rejecting access to an interface, may be avoided. In this case, a situation where the web application reports an error due to a failure of interface invoking and normal use is affected may be avoided, thus user experience will be improved.

Figure 26:
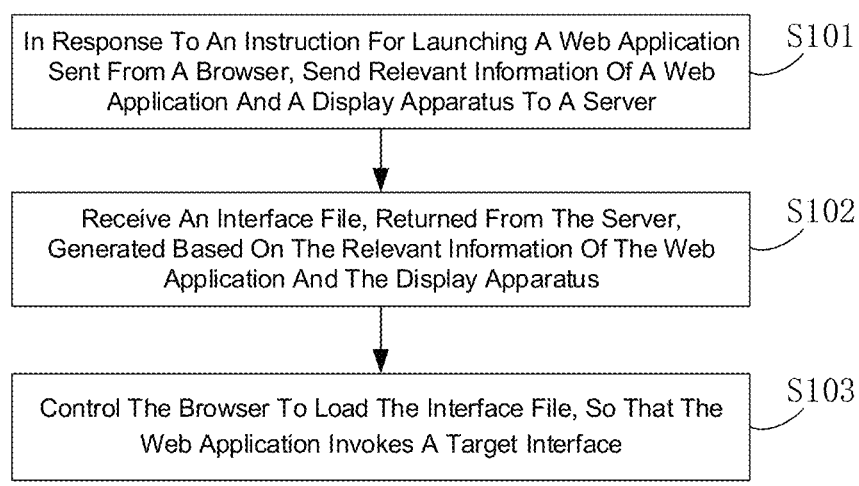
FIG. 26 is a flowchart of an interface invoking method for a web application in a display apparatus 200 according to an embodiment of the present application.

FIG. 26 is a flowchart of an interface invoking method for a web application in a display apparatus 200 according to an embodiment of the present application. As shown in FIG. 26, the interface invoking method for a web application includes the following steps.

S101. In response to an instruction for launching a web application sent from a browser, send relevant information of the web application and the display apparatus 200 to a server 400.

S102. Receive an interface file, returned from the server 400, generated based on the relevant information of the web application and the display apparatus 200.

S103. Control the browser to load the interface file, so that the web application invokes a target interface.

Figure 27:
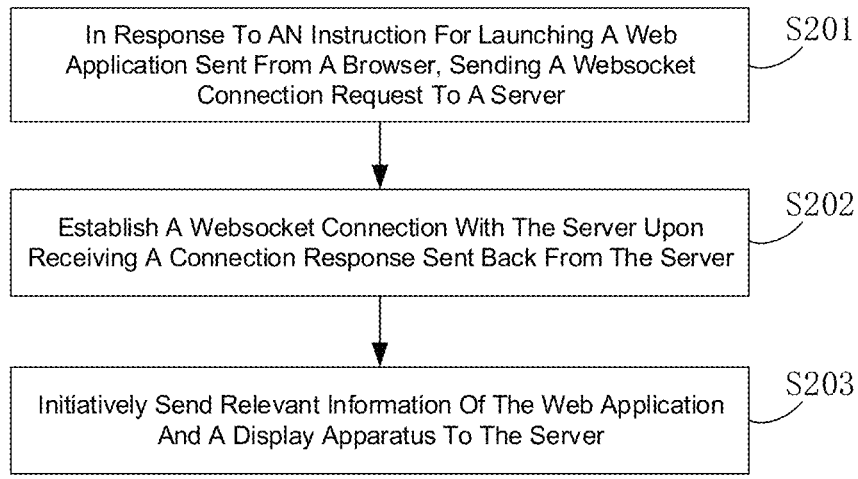
FIG. 27 is a flowchart of a method for sending information to a server 400 from a display apparatus 200 according to an embodiment of the present application.

FIG. 27 is a flowchart of a method for sending information to a server 400 from a display apparatus 200 according to an embodiment of the present application. In some embodiments, as shown in FIG. 27, in the interface invoking method for a web application in a display apparatus 200, the step of sending the relevant information of the web application and the display apparatus 200 to the server 400 further includes the following steps.

S201. In response to an instruction for launching a web application sent from the browser, send a WebSocket connection request to the server 400, where the WebSocket connection request is used to indicate that the display apparatus 200 requests to establish a full-duplex communication connection with the server 400 on a single TCP connection.

S202. Establish a WebSocket connection with the server 400 upon receiving a connection response returned from the server 400.

S203. Initiatively send relevant information of the web application and display apparatus 200 to the server 400.

In some embodiments, in the interface invoking method for a web application in a display apparatus 200, before sending the relevant information of the web application and the display apparatus 200 to the server 400, as for configuration content of a system version of the display apparatus 200, interface information corresponding to a current system version may be further stored in the server 400, where the interface information is used to indicate set content and permission content of the display apparatus 200 corresponding to all interfaces in the current system version.

In some embodiments, in the interface invoking method for a web application in a display apparatus 200, the sending the relevant information of the web application and the display apparatus 200 to the server 400 may further include: obtaining system version information about the display apparatus 200 and interface requirements information about a web application currently to be launched, where the interface requirements information is used to indicate information about the target interface that needs to be invoked by the web application; and sending the system version information and the interface requirements information to the server 400.

Figure 28:
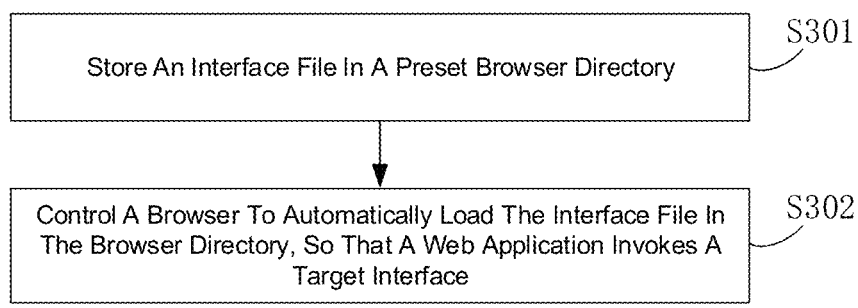
FIG. 28 is a flowchart of a method for invoking a target interface by a display apparatus 200 according to an embodiment of the present application.

FIG. 28 is a flowchart of a method for invoking a target interface by a display apparatus 200 according to an embodiment of the present application. In some embodiments, as shown in FIG. 28, the foregoing step of controlling the browser to load the interface file, so that the web application invokes the target interface may further include the following steps.

S301. Store the interface file in a preset browser directory, where read/write permission of the browser directory is open merely to an interface invoking operation of the current web application.

S302. Control the browser to automatically load the interface file in the browser directory, so that the web application invokes the target interface.

Figure 29:
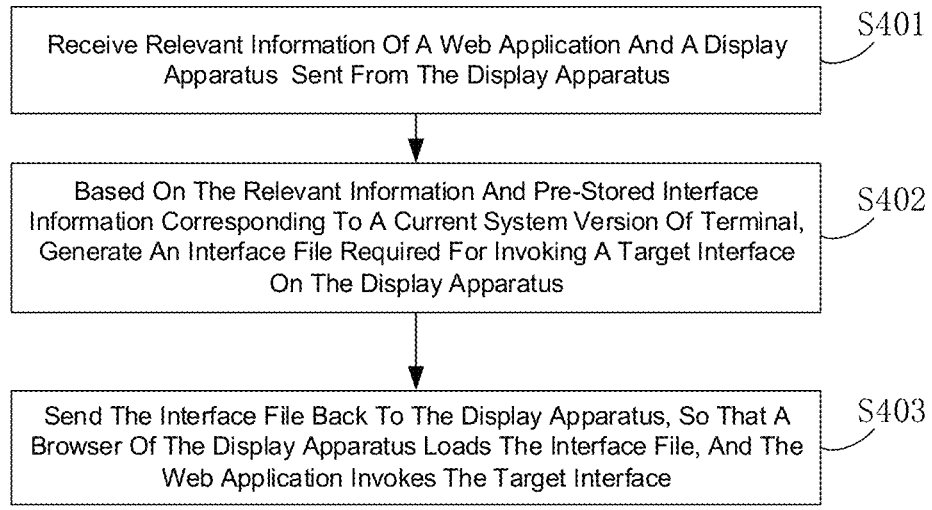
FIG. 29 is a flowchart of an interface invoking method for a web application in a server 400 according to an embodiment of the present application.

FIG. 29 is a flowchart of an interface invoking method for a web application in a server 400 according to an embodiment of the present application. As shown in FIG. 29, the interface invoking method for a web application includes the following steps.

S401. Receive relevant information of a web application and a display apparatus 200 sent from the display apparatus 200.

S402. Based on the relevant information and pre-stored interface information corresponding to a current system version of the display apparatus 200, generate an interface file required for invoking a target interface on the display apparatus 200, where the interface file is used to determine use permission and a parameter of the target interface.

S403. Send the interface file back to the display apparatus 200, so that a browser of the display apparatus 200 loads the interface file and the web application invokes the target interface.

Similarly, in order to simplify a communication process between the display apparatus 200 and the server 400 and quickly realize the communications between the two parties, in some embodiments, a WebSocket connection may be established between the display apparatus 200 and the server 400. In this way, before the step of receiving the relevant information of the web application and the display apparatus 200 sent from the display apparatus 200, the following may be further included: receiving a WebSocket connection request sent from the display apparatus 200, where the WebSocket connection request is a request sent from the display apparatus 200 in response to an instruction for launching a web application sent from the browser, and the WebSocket connection request is used to indicate that the display apparatus 200 requests to establish a connection with the server 400 for full-duplex communication connections on a single TCP connection; and sending a connection response back to the display apparatus 200, to establish a WebSocket connection with the display apparatus 200.

Figure 30:
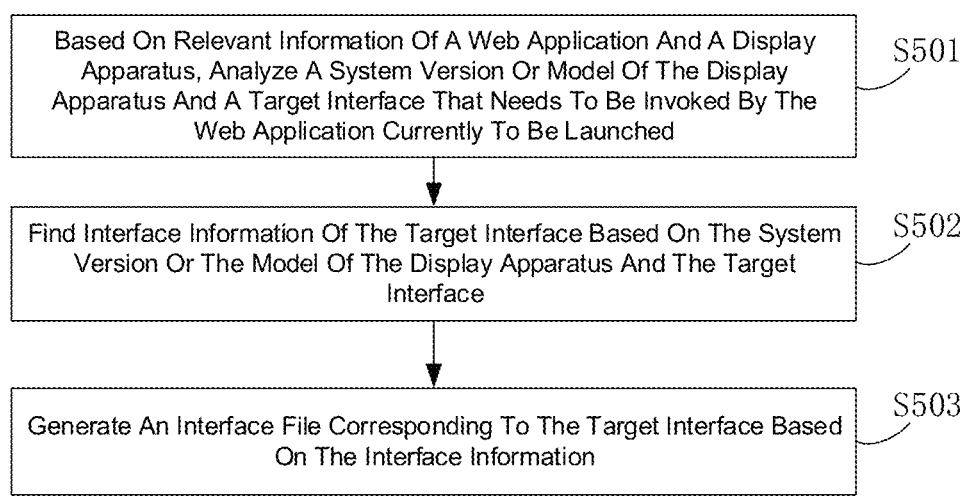
FIG. 30 is a flowchart of a method for generating an interface file by a server 400 according to an embodiment of the present application.

FIG. 30 is a flowchart of a method for generating an interface file by a server 400 according to an embodiment of the present application. In some embodiments, as shown in FIG. 30, the step of generating an interface file by the server 400 may further include the following steps.

S501. Based on the relevant information of the web application and the display apparatus 200, analyze a system version or model of the display apparatus 200 and the target interface that needs to be invoked by the web application currently to be launched.

S502. Find interface information of the target interface based on the system version or the model of the display apparatus 200 and the target interface.

S503. Generate the interface file corresponding to the target interface based on the interface information.

In specific implementations, the present application further provides a computer non-volatile storage medium where programs or instructions are stored thereon. The programs or instructions, while being executed, can perform some or all of the steps in the embodiments of the method for loading a loading page of an application provided according to the present disclosure. The storage medium may include a magnetic disk, a compact disc, a read-only memory (ROM), a random access memory (RAM), or the like.

For ease of explanation, description has been made above with reference to specific embodiments. However, the foregoing exemplary discussions are not intended to be exhaustive or to limit the implementations to the specific form disclosed above. According to the foregoing teachings, various modifications and variations may be obtained. Description of the foregoing implementations is for better explaining the principles and practical applications, so that a person skilled in the art can better understand the embodiments.

What is claimed is:
1. A display apparatus, comprising:
 a display, configured for presenting an image from a broadcast system or network and/or a user interface; and
 a controller in connection with the display, configured for:

in response to an instruction for launching an application, obtaining a URL of the application, a code package of the application, and a URL of a loading page of the application;

reading, from the code package, a loading parameter for enabling the loading page of the application to present display content, in response to the URL of the application being a target protocol URL;

generating a new URL of the loading page by writing the loading parameter into the URL of the loading page; and presenting, on the display, the loading page comprising the display content corresponding to the loading parameter, based on the new URL of the loading page.

2. The display apparatus according to claim 1, wherein the controller is further configured for:

reading an application description file of the application from the code package; and obtaining the loading parameter for enabling the loading page of the application to present the display content by parsing the application description file.

3. The display apparatus according to claim 2, wherein the controller is further configured for:

parsing the application description file and storing all file contents obtained through parsing into a character string;

in response to a field for indicating the loading parameter being in the character string, parsing the character string and storing a parsing result to a data object in which all the file contents of the application description file are stored; and obtaining a target structural format corresponding to the field for indicating the loading parameter in the data object and determining the file content corresponding to the target structural format as the loading parameter.

4. The display apparatus according to claim 3, wherein the target structural format comprises a first-level structure, a second-level structure, and a third-level structure; and the controller is further configured for:

determining whether the target structural format for the field for indicating the loading parameter is the first-level structure;

in response to the target structural format being the first-level structure, determining the file content corresponding to the first-level structure as the loading parameter; and in response to the target structural format being not the first-level structure, further determining whether the target structural format for the field for indicating the loading parameter is the second-level structure.

5. The display apparatus according to claim 4, wherein the controller is further configured for:

in response to the target structural format being the second-level structure, determining the file content corresponding to the second-level structure as the loading parameter; and in response to the target structural format being not the second-level structure, determining the file content corresponding to the third-level structure as the loading parameter.

6. The display apparatus according to claim 5, wherein the controller is further configured for:

obtaining the file content in the first-level structure corresponding to the field for indicating the loading parameter; and obtaining, from the file content in the first-level structure, the file content in the second-level structure corresponding to the field for indicating the loading parameter, and determining the file content in the second-level structure as the loading parameter.

7. The display apparatus according to claim 5, wherein the controller is further configured for:

obtaining the file content in the first-level structure corresponding to the field for indicating the loading parameter;

obtaining, from the file content in the first-level structure, the file content in the second-level structure corresponding to the field for indicating the loading parameter; and obtaining, from the file content in the second-level structure, the file content in the third-level structure corresponding to the field for indicating the loading parameter, and determining the file content in the third-level structure as the loading parameter, wherein the third-level structure is the target structural format for the field for indicating the loading parameter.

8. The display apparatus according to claim 1, wherein the controller is further configured for:

loading an application display page of the application in the background in a scenario where the loading page is presented on the display; and presenting the application display page of the application on the display in a scenario where a display duration of the loading page reaches a preset duration, and cancelling presentation of the loading page.

9. The display apparatus according to claim 8, wherein the controller is further configured for:

obtaining a designated launching action, an APPID, and an APP parameter that correspond to the application by parsing the URL of the application;

obtaining an index configuration file of the application, and searching the index configuration file for an APPURL corresponding to the APPID, wherein the APPURL is configured to indicate a real access path by which the application is stored in the display apparatus;

parsing an application description file of the application, and determining designated access page information of the application corresponding to the designated launching action; and packaging the APP parameter, the APPURL, and the designated access page information into a file protocol URL, and loading the application display page of the application in the background based on the file protocol URL.

10. The display apparatus according to claim 1, wherein the controller is further configured for:

generating a download request for downloading the code package of the application, sending the download request to a cloud server, and presenting a code package downloading page showing a downloading progress bar on the display, wherein the download request is configured to instruct the cloud server to return the code package of the application; and locally storing the code package of the application returned from the cloud server, in response to the downloading progress bar being in a completed state.

11. A method for loading a loading page of an application in a display apparatus, comprising:

in response to an instruction for launching an application, obtaining a URL of the application, a code package of the application, and a URL of a loading page of the application;

reading, from the code package, a loading parameter for enabling the loading page of the application to present display content, in response to the URL of the application being a target protocol URL;

generating a new URL of the loading page by writing the loading parameter into the URL of the loading page; and presenting, on a display, the loading page comprising the display content corresponding to the loading parameter, based on the new URL of the loading page.

12. The method according to claim 11, further comprising:

reading an application description file of the application from the code package; and obtaining the loading parameter for enabling the loading page of the application to present the display content by parsing the application description file.

13. The method according to claim 12, further comprising:

parsing the application description file and storing all file contents obtained through parsing into a character string;

in response to a field for indicating the loading parameter being in the character string, parsing the character string and storing a parsing result to a data object in which all the file contents of the application description file are stored; and obtaining a target structural format corresponding to the for indicating the loading parameter in the data object and determining the file content corresponding to the target structural format as the loading parameter.

14. The method according to claim 13, wherein the target structural format comprises a first-level structure, a second-level structure, and a third-level structure, and the method further comprises:

determining whether the target structural format for the for indicating the loading parameter is the first-level structure;

in response to the target structural format being the first-level structure, determining the file content corresponding to the first-level structure as the loading parameter; and in response to the target structural format is not the first-level structure, further determining whether the target structural format for the for indicating the loading parameter is the second-level structure.

15. The method according to claim 14, further comprising:

in response to the target structural format being the second-level structure, determining the file content corresponding to the second-level structure as the loading parameter; and in response to the target structural format being not the second-level structure, determining the file content corresponding to the third-level structure as the loading parameter.

16. The method according to claim 15, further comprising:

obtaining the file content in the first-level structure corresponding to the field for indicating the loading parameter; and obtaining, from the file content in the first-level structure, the file content in the second-level structure corresponding to the field for indicating the loading parameter, and determining the file content in the second-level structure as the loading parameter.

17. The method according to claim 15, further comprising:

obtaining the file content in the first-level structure corresponding to the field for indicating the loading parameter;

obtaining, from the file content in the first-level structure, the file content in the second-level structure corresponding to the field for indicating the loading parameter; and obtaining, from the file content in the second-level structure, the file content in the third-level structure corresponding to the field for indicating the loading parameter, and determining the file content in the third-level structure as the loading parameter, wherein the third-level structure is the target structural format for the field for indicating the loading parameter.

18. The method according to claim 11, further comprising:

loading an application display page of the application in the background in a scenario where the loading page is presented on the display; and presenting the application display page of the application on the display in a scenario where a display duration of the loading page reaches a preset duration, and cancelling presentation of the loading page.

19. The method according to claim 18, further comprising:

obtaining a designated launching action, an APPID, and an APP parameter that correspond to the application by parsing the URL of the application;

obtaining an index configuration file of the application, and searching the index configuration file for an APPURL corresponding to the APPID, wherein the APPURL is configured to indicate a real access path by which the application is stored in the display apparatus;

parsing an application description file of the application, and determining designated access page information of the application corresponding to the designated launching action; and packaging the APP parameter, the APPURL, and the designated access page information into a file protocol URL, and loading the application display page of the application in the background based on the file protocol URL.

20. The method according to claim 11, further comprising:

generating a download request for downloading the code package of the application, sending the download request to a cloud server, and presenting a code package downloading page showing a downloading progress bar on the display, wherein the download request is configured to instruct the cloud server to return the code package of the application; and locally storing the code package of the application returned from the cloud server, in response to the downloading progress bar being in a completed state.

* * * * *